US012592513B2

(12) United States Patent
Byrne et al.

(10) Patent No.: US 12,592,513 B2
(45) Date of Patent: Mar. 31, 2026

(54) POKE-THROUGH ELECTRICAL ASSEMBLY

(71) Applicants: Norman R. Byrne, Ada, MI (US); Aaron G. Lautenbach, Rockford, MI (US); Matthew R. Haller, Grandville, MI (US); Marc A. Mitchell, Belmont, MI (US); Matthew R. Andree, Rockford, MI (US); Peter J. Maher, Grand Rapids, MI (US); Timothy C. Cramblet, Grand Rapids, MI (US)

(72) Inventors: Norman R. Byrne, Ada, MI (US); Aaron G. Lautenbach, Rockford, MI (US); Matthew R. Haller, Grandville, MI (US); Marc A. Mitchell, Belmont, MI (US); Matthew R. Andree, Rockford, MI (US); Peter J. Maher, Grand Rapids, MI (US); Timothy C. Cramblet, Grand Rapids, MI (US)

(73) Assignee: Norman R. Byrne, Ada, MI (US)

( * ) Notice: Subject to any disclaimer, the term of this patent is extended or adjusted under 35 U.S.C. 154(b) by 0 days.

(21) Appl. No.: 18/333,155

(22) Filed: Jun. 12, 2023

(65) Prior Publication Data

US 2023/0327368 A1 Oct. 12, 2023

Related U.S. Application Data

(63) Continuation of application No. 17/723,631, filed on Apr. 19, 2022, now Pat. No. 11,677,178, which is a
(Continued)

(51) Int. Cl.
*H01R 13/52* (2006.01)
*H01R 13/447* (2006.01)
(Continued)

(52) U.S. Cl.
CPC ....... *H01R 13/5213* (2013.01); *H01R 13/447* (2013.01); *H01R 13/5202* (2013.01);
(Continued)

(58) Field of Classification Search
CPC .............. H01R 13/5213; H01R 13/447; H01R 13/5202; H01R 13/73; H01R 13/11;
(Continued)

(56) References Cited

U.S. PATENT DOCUMENTS

| | | | |
|---|---|---|---|
| 1,767,323 A | 6/1930 | Staples | |
| 1,869,841 A * | 8/1932 | Buchanan | .............. H02G 3/185 |
| | | | 174/57 |

(Continued)

FOREIGN PATENT DOCUMENTS

| | | |
|---|---|---|
| CA | 2296190 | 7/2000 |
| CA | 2552014 C | 11/2010 |

(Continued)

*Primary Examiner* — Justin M Kratt

(74) *Attorney, Agent, or Firm* — Gardner, Linn, Burkhart & Ondersma LLP

(57) ABSTRACT

An electrical power and/or electronic data unit is mountable in a floor, and is fitted with an upper bezel that is openable and closable to provide selective access to an interior of the unit, which is optionally fitted with one or more electrical power or data outlets. A lower insert including an intumescent block is supported below an upper housing, and is angularly adjustable relative to the upper housing. One or more bores or openings formed in the lower insert allow the passage of cords into a pass-through opening in the upper housing, and out through an upper bezel cover.

20 Claims, 21 Drawing Sheets

Related U.S. Application Data continuation of application No. 16/538,531, filed on Aug. 12, 2019, now Pat. No. 11,309,658.

(60) Provisional application No. 62/718,377, filed on Aug. 13, 2018.

(51) Int. Cl.

| | |
|---|---|
| *H01R 13/73* | (2006.01) |
| *H01R 13/11* | (2006.01) |
| *H01R 13/187* | (2006.01) |
| *H01R 13/42* | (2006.01) |
| *H01R 13/422* | (2006.01) |
| *H01R 13/426* | (2006.01) |
| *H01R 13/44* | (2006.01) |
| *H01R 13/46* | (2006.01) |
| *H01R 13/629* | (2006.01) |
| *H01R 13/74* | (2006.01) |
| *H01R 24/76* | (2011.01) |
| *H01R 24/78* | (2011.01) |
| *H01R 25/00* | (2006.01) |
| *H02G 3/08* | (2006.01) |
| *H02G 3/12* | (2006.01) |
| *H02G 3/14* | (2006.01) |
| *H02G 3/18* | (2006.01) |

(52) U.S. Cl.
CPC ............. *H01R 13/73* (2013.01); *H01R 13/11* (2013.01); *H01R 13/113* (2013.01); *H01R 13/187* (2013.01); *H01R 13/42* (2013.01); *H01R 13/422* (2013.01); *H01R 13/4223* (2013.01); *H01R 13/426* (2013.01); *H01R 13/44* (2013.01); *H01R 13/46* (2013.01); *H01R 13/52* (2013.01); *H01R 13/5219* (2013.01); *H01R 13/62927* (2013.01); *H01R 13/74* (2013.01); *H01R 13/748* (2013.01); *H01R 24/76* (2013.01); *H01R 24/78* (2013.01); *H01R 25/006* (2013.01); *H02G 3/08* (2013.01); *H02G 3/081* (2013.01); *H02G 3/083* (2013.01); *H02G 3/088* (2013.01); *H02G 3/12* (2013.01); *H02G 3/14* (2013.01); *H02G 3/18* (2013.01); *H02G 3/185* (2013.01)

(58) Field of Classification Search
CPC .... H01R 13/113; H01R 13/187; H01R 13/42; H01R 13/422; H01R 13/4223; H01R 13/426; H01R 13/44; H01R 13/46; H01R 13/52; H01R 13/5219; H01R 13/62927; H01R 13/74; H01R 13/748; H01R 24/76; H01R 24/78; H01R 25/006; H02G 3/08; H02G 3/081; H02G 3/083; H02G 3/088; H02G 3/12; H02G 3/14; H02G 3/18; H02G 3/185

See application file for complete search history.

(56) References Cited

U.S. PATENT DOCUMENTS

| | | | |
|---|---|---|---|
| 2,886,630 A * | 5/1959 | Gill | H02G 3/121 |
| | | | 220/3.7 |
| 2,969,142 A | 1/1961 | Mack | |
| 3,433,886 A | 3/1969 | Myers | |
| 3,865,456 A | 2/1975 | Dola | |
| 3,956,573 A | 5/1976 | Myers et al. | |
| 4,057,164 A | 11/1977 | Maier | |
| 4,091,231 A | 5/1978 | Sotolongo | |
| 4,094,492 A | 6/1978 | Beeman et al. | |
| 4,237,666 A | 12/1980 | Kohaut | |
| 4,259,542 A | 3/1981 | Tehan et al. | |
| 4,451,101 A | 5/1984 | Davis | |
| 4,496,067 A | 1/1985 | Benscoter | |
| 4,591,656 A | 5/1986 | Mohr | |
| 4,721,476 A | 1/1988 | Zeliff et al. | |
| 4,770,643 A | 9/1988 | Castellani et al. | |
| 4,916,258 A | 4/1990 | Mohr | |
| 5,010,211 A | 4/1991 | Bartee | |
| 5,023,396 A | 6/1991 | Bartee et al. | |
| 5,032,690 A | 7/1991 | Bloom | |
| 5,107,072 A | 4/1992 | Morgan | |
| 5,147,979 A | 9/1992 | Yang | |
| 5,195,288 A | 3/1993 | Penczak | |
| D356,294 S | 3/1995 | Fladung | |
| 5,422,434 A | 6/1995 | Wuertz et al. | |
| 5,455,388 A | 10/1995 | Pratt | |
| 5,466,886 A | 11/1995 | Lengyel et al. | |
| 5,627,340 A | 5/1997 | Smith et al. | |
| 5,705,772 A | 1/1998 | Brown | |
| 6,018,126 A | 1/2000 | Castellani et al. | |
| 6,114,623 A | 9/2000 | Bonilla et al. | |
| D432,499 S | 10/2000 | Stekelenburg | |
| 6,175,078 B1 | 1/2001 | Bambardekar et al. | |
| 6,265,662 B1 | 7/2001 | Riedy et al. | |
| 6,307,152 B1 | 10/2001 | Bonilla et al. | |
| 6,417,446 B1 | 7/2002 | Whitehead | |
| 6,417,450 B1 | 7/2002 | Young | |
| 6,462,277 B1 | 10/2002 | Young et al. | |
| 6,469,249 B2 | 10/2002 | Capella | |
| 6,483,028 B2 | 11/2002 | DeBartolo, Jr. et al. | |
| 6,495,753 B1 | 12/2002 | Goodsell et al. | |
| 6,545,215 B2 | 4/2003 | Young et al. | |
| 6,551,130 B2 | 4/2003 | Bonilla | |
| 6,552,262 B2 | 4/2003 | English et al. | |
| 6,612,081 B2 | 9/2003 | Cole et al. | |
| 6,635,822 B2 | 10/2003 | Krupa, Jr. | |
| 6,669,041 B2 | 12/2003 | Almond | |
| 6,696,640 B1 | 2/2004 | Castellani et al. | |
| 6,720,495 B2 | 4/2004 | Castellani et al. | |
| 6,750,395 B2 | 6/2004 | Stout et al. | |
| 6,790,084 B1 | 9/2004 | Osborn, Jr. et al. | |
| 6,824,006 B2 | 11/2004 | Lambelet, Jr. | |
| 6,840,785 B2 | 1/2005 | Drane | |
| 6,848,227 B2 | 2/2005 | Whitty | |
| 6,854,226 B2 | 2/2005 | Cole et al. | |
| 6,887,088 B2 | 5/2005 | Bousquet | |
| 7,053,296 B2 | 5/2006 | Drane et al. | |
| 7,064,268 B2 | 6/2006 | Dinh | |
| 7,078,616 B2 | 7/2006 | Roesch et al. | |
| 7,082,729 B2 | 8/2006 | Cole et al. | |
| 7,105,742 B1 | 9/2006 | Jolly | |
| 7,105,745 B2 | 9/2006 | Drane et al. | |
| 7,183,503 B2 | 2/2007 | Bowman et al. | |
| 7,193,160 B2 | 3/2007 | Dinh | |
| 7,271,351 B2 | 9/2007 | Drane | |
| D553,306 S | 10/2007 | Hansen | |
| 7,276,662 B2 | 10/2007 | Drane | |
| 7,301,100 B2 | 11/2007 | Drane et al. | |
| 7,319,193 B2 | 1/2008 | Halterman | |
| 7,442,883 B2 | 10/2008 | Jolly et al. | |
| 7,511,231 B2 | 3/2009 | Drane et al. | |
| 7,569,776 B2 | 8/2009 | Jolly et al. | |
| 7,586,039 B1 | 9/2009 | Gretz | |
| 7,635,110 B2 | 12/2009 | Galasso et al. | |
| 7,674,990 B2 * | 3/2010 | Drane | H02G 3/0493 |
| | | | 174/57 |
| 7,795,544 B2 | 9/2010 | Peck | |
| 7,838,769 B2 | 11/2010 | Peck | |
| 7,847,199 B2 | 12/2010 | Drane et al. | |
| 8,052,008 B2 | 11/2011 | Drane et al. | |
| 8,063,317 B2 | 11/2011 | Bowman | |
| 8,242,365 B2 | 8/2012 | Galasso et al. | |
| 8,357,852 B2 | 1/2013 | Drane | |
| 8,581,098 B2 | 11/2013 | Von Gal | |
| D697,872 S | 1/2014 | Roemer et al. | |
| 8,637,780 B2 | 1/2014 | Hunt et al. | |
| 8,878,058 B2 | 11/2014 | Wurms et al. | |
| 8,921,695 B2 | 12/2014 | Drane | |
| 8,944,266 B2 | 2/2015 | Roemer et al. | |
| 9,112,298 B1 | 8/2015 | Hayden et al. | |

(56)  References Cited

U.S. PATENT DOCUMENTS

| | | |
|---|---|---|
| 9,148,007 B2 | 9/2015 | Drane |
| 9,176,531 B1 | 11/2015 | Hayden et al. |
| D746,237 S | 12/2015 | Sumwalt et al. |
| D746,238 S | 12/2015 | Sumwalt et al. |
| 9,236,723 B2 | 1/2016 | Scanzillo et al. |
| 9,257,776 B2 | 2/2016 | Kramer |
| 9,276,347 B2 | 3/2016 | Wang |
| 9,490,616 B1 | 11/2016 | Galasso et al. |
| 9,499,373 B1 | 11/2016 | Kim |
| 9,521,227 B2 | 12/2016 | Kim |
| 9,560,778 B2 | 1/2017 | Huang |
| 9,667,053 B2 | 5/2017 | Wurms |
| 9,673,598 B2 | 6/2017 | DeBartolo, Jr. et al. |
| 9,685,730 B2 | 6/2017 | Jones et al. |
| 9,692,219 B2 | 6/2017 | Galasso et al. |
| 9,705,298 B2 | 7/2017 | Dinh |
| 9,831,648 B1 | 11/2017 | Gretz |
| 9,912,134 B2 | 3/2018 | DeBartolo et al. |
| 9,960,585 B2 | 5/2018 | Galasso et al. |
| 10,050,424 B2 | 8/2018 | Jones et al. |
| 10,285,301 B1 * | 5/2019 | Bailey ..................... H02G 3/18 |
| 10,637,225 B1 | 4/2020 | Galasso et al. |
| 10,770,875 B2 | 9/2020 | Byrne et al. |
| 11,050,228 B2 | 6/2021 | Byrne et al. |
| 11,309,658 B2 | 4/2022 | Byrne et al. |
| 11,677,178 B2 | 6/2023 | Byrne et al. |
| 2010/0150544 A1 | 6/2010 | Koop |
| 2014/0162480 A1 | 6/2014 | Schutte et al. |
| 2017/0256930 A1 | 9/2017 | Wurms |
| 2018/0166872 A1 * | 6/2018 | Scanzillo ............... H02G 3/185 |
| 2021/0328414 A1 | 10/2021 | Byrne et al. |

FOREIGN PATENT DOCUMENTS

| | | |
|---|---|---|
| CH | 647898 | 2/1985 |
| DE | 4042218 | 2/1992 |
| DE | 202010003879 | 9/2011 |
| EP | 0648000 | 4/1997 |
| EP | 0802599 | 10/1997 |
| EP | 0852418 | 7/1998 |
| GB | 1388873 | 3/1975 |
| GB | 2211364 | 6/1989 |
| GB | 2241389 | 8/1991 |
| JP | H05326064 | 12/1993 |
| JP | H1041031 | 2/1998 |

* cited by examiner

244a

244b

222

222

TOP

246a

222

222

POKE-THROUGH ELECTRICAL ASSEMBLY

CROSS REFERENCE TO RELATED APPLICATIONS

The present application is a continuation of U.S. patent application, Ser. No. 17/723,631, filed Apr. 19, 2022, now U.S. Pat. No. 11,677,178, which is a continuation of U.S. patent application, Ser. No. 16/538,531, filed Aug. 12, 2019, now U.S. Pat. No. 11,309,658, which claims the benefit of U.S. provisional application Ser. No. 62/718,377, filed Aug. 13, 2018, which are all hereby incorporated herein by reference in their entireties.

FIELD OF THE INVENTION

The present invention relates to power and/or data systems that are mountable in floors or work surfaces such as desks, tables, and the like.

BACKGROUND OF THE INVENTION

Conventional power and data systems provide a variety of interconnections and flexibility. Power and data systems may be inserted into openings formed in floors (including elevated floor systems) and walls, and integrated into furniture, such as tables, desks, and other office furniture. So-called "poke-through" electrical or data units are typically cylindrical or box-like in overall shape, with circular, rectangular, or square surfaces that are exposed in an area where access to electrical power and/or electronic data is desirable. The exposed portion of the electrical or data unit often includes a bezel that is positioned atop or flush with the exposed floor surface, wall surface, or furniture surface to which the unit is mounted. The bezel generally defines an opening through which the unit's electrical power and/or electronic data outlets are made accessible to users in a work area or the like.

SUMMARY OF THE INVENTION

The present invention provides a poke-through electrical power and/or electronic data unit having an upper bezel or face that is optionally fitted with a closure mechanism selectively covering and exposing one or more electrical power and/or electronic data outlets that are recessed behind or below the bezel or face, or for exposing pass-through openings to permit electrical cords to pass through the unit and into a surrounding work area.

In one form of the present invention, an electrical power and/or electronic data unit is mountable in a floor such as a subfloor or a raised floor surface, or may be mountable in a work surface or the like. The unit provides users with access to electrical power and/or electronic data, either with outlets provided at the unit itself, or by providing a pass-through for power or data cords that are routed up from below the surface in which the unit is mounted. An upper housing is mountable at an opening formed in the floor or work surface, and defines a pass-through opening along a longitudinal housing axis. An upper bezel cover is mounted to an upper portion of the upper housing and extends over the floor or work surface around the opening formed in the floor or work surface. A lower insert is spaced below the upper housing and has a longitudinal insert axis. The lower insert includes a block of intumescent material defining a pass-through bore. A set of coupling fasteners secure the lower insert to the upper housing, and the coupling fasteners are independently adjustable so that the lower insert is positionable with the longitudinal insert axis in parallel alignment with the longitudinal housing axis, and so that the lower insert is also positionable with the longitudinal insert axis set non-parallel to the longitudinal housing axis. The upper bezel cover is removable or openable to provide pass-through access to the pass-through opening of the upper housing and the pass-though bore of the lower insert for routing cords through the opening formed in the floor or work surface and into a work area.

In one aspect, the lower insert defines first and second ones of the pass-though bores in the block. In that case, the upper bezel cover may define corresponding first and second bezel openings fitted with respective covers that are selectively removable or openable to expose the first and second bezel openings.

In another aspect, a top plate is disposed along an upper surface of the block and defines a top plate opening aligned with the pass-through bore of the block, and a bottom plate disposed along a lower surface of the block and defining a bottom plate opening aligned with the pass-through bore of the block.

Therefore, the electrical power and/or electronic data unit can allow cords to be routed into and around within a work area serviced by the unit, and can optionally be fitted with electrical power outlets and/or electronic data outlets to further service the work area.

These and other objects, advantages, purposes and features of the present invention will become apparent upon review of the following specification in conjunction with the drawings.

BRIEF DESCRIPTIONS OF THE DRAWINGS

DESCRIPTION OF THE PREFERRED EMBODIMENTS

Figures 1, 2:
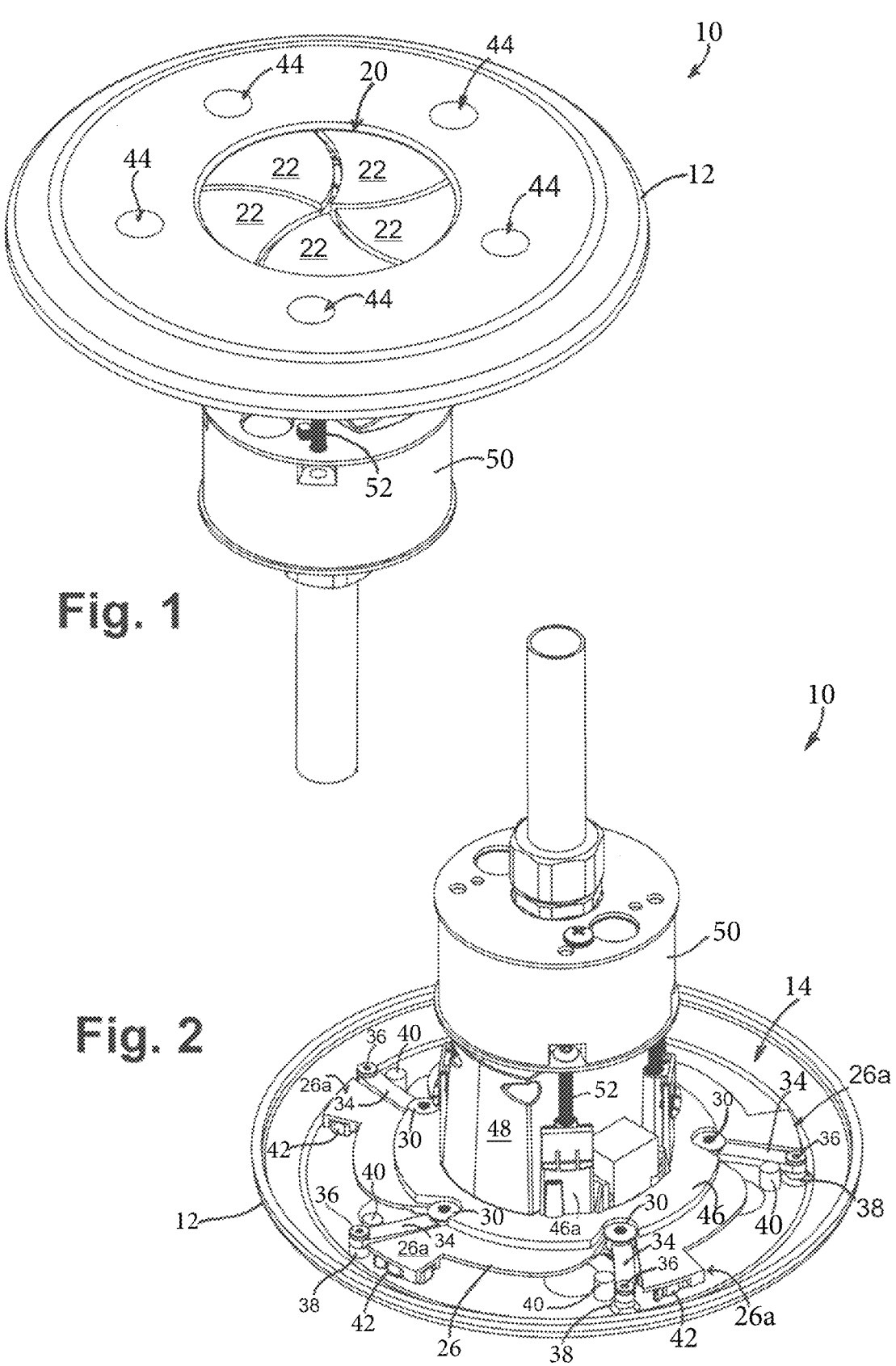
FIG. 1 is a top perspective view of a poke-through electrical power unit with iris-closure bezel, in accordance with the present invention.
FIG. 2 is a bottom perspective view of the poke-through electrical power unit of FIG. 1.
Figures 3, 4A, 4B:
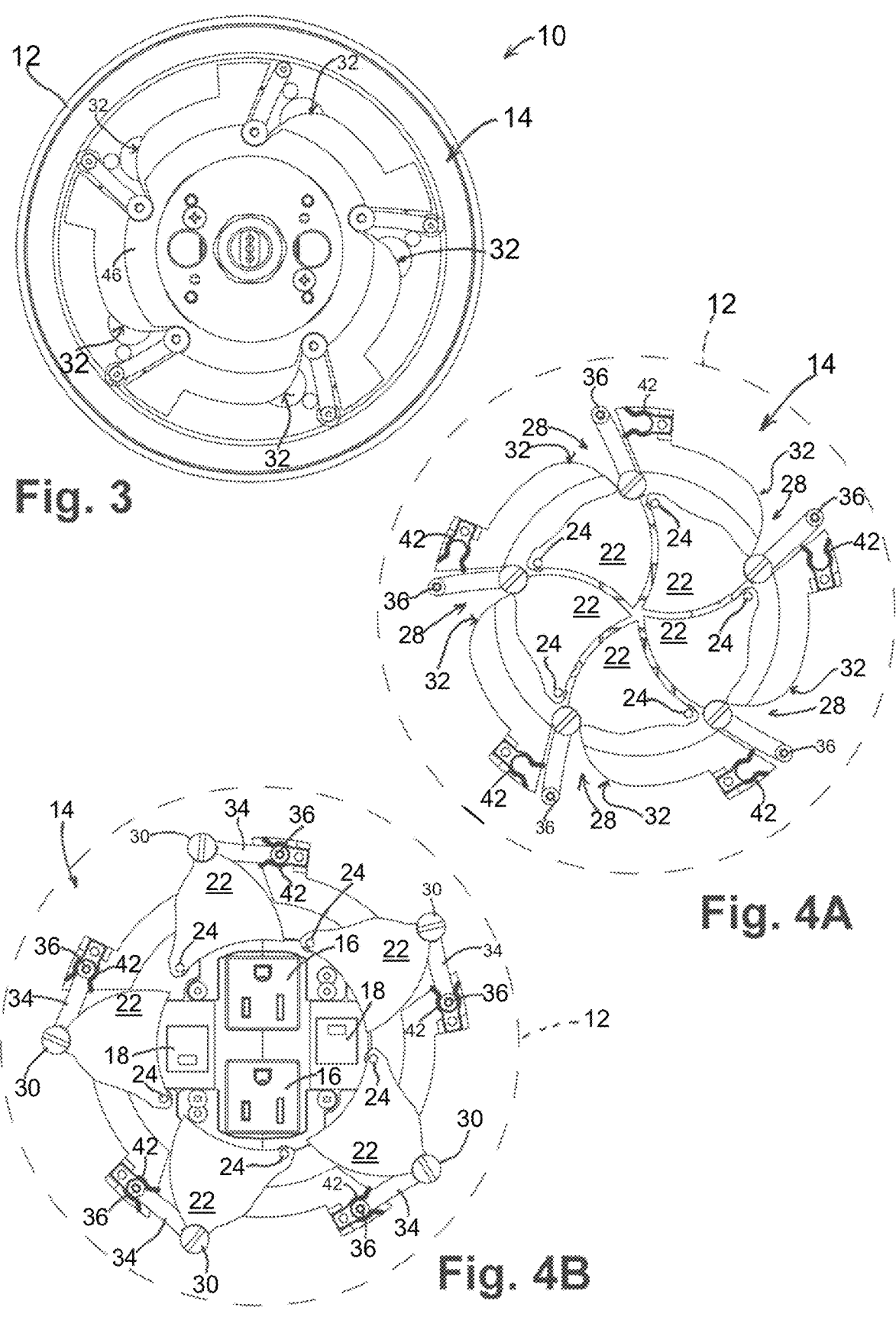
FIG. 3 is a bottom plan view of the poke-through electrical power unit of FIG. 1.
FIG. 4A is a top plan view of portions of the iris-closure mechanism of the poke-through electrical power unit of FIG. 1, with iris shutters shown in a closed configuration and upper bezel surface omitted to show underlying structure.
FIG. 4B is another top plan view of portions of the iris-closure mechanism of FIG. 4A, with the iris shutters shown in an open configuration.
Figures 5A, 5B, 5C:
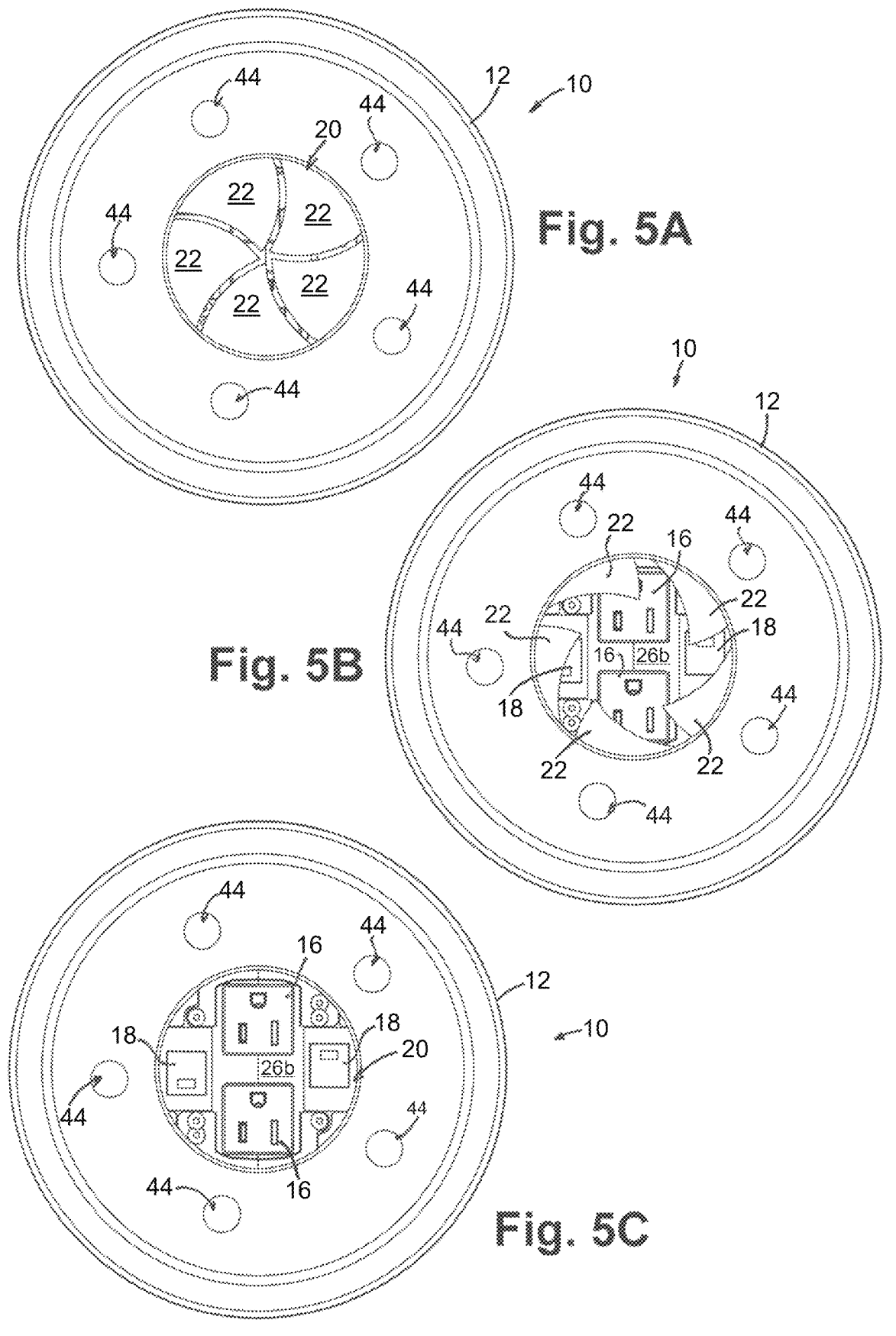
FIGS. 5A-5C are three sequential top plan views of the electrical power unit of FIG. 1, showing fully-closed, partially-open, and fully-open configurations, respectively.
Figures 6, 7:
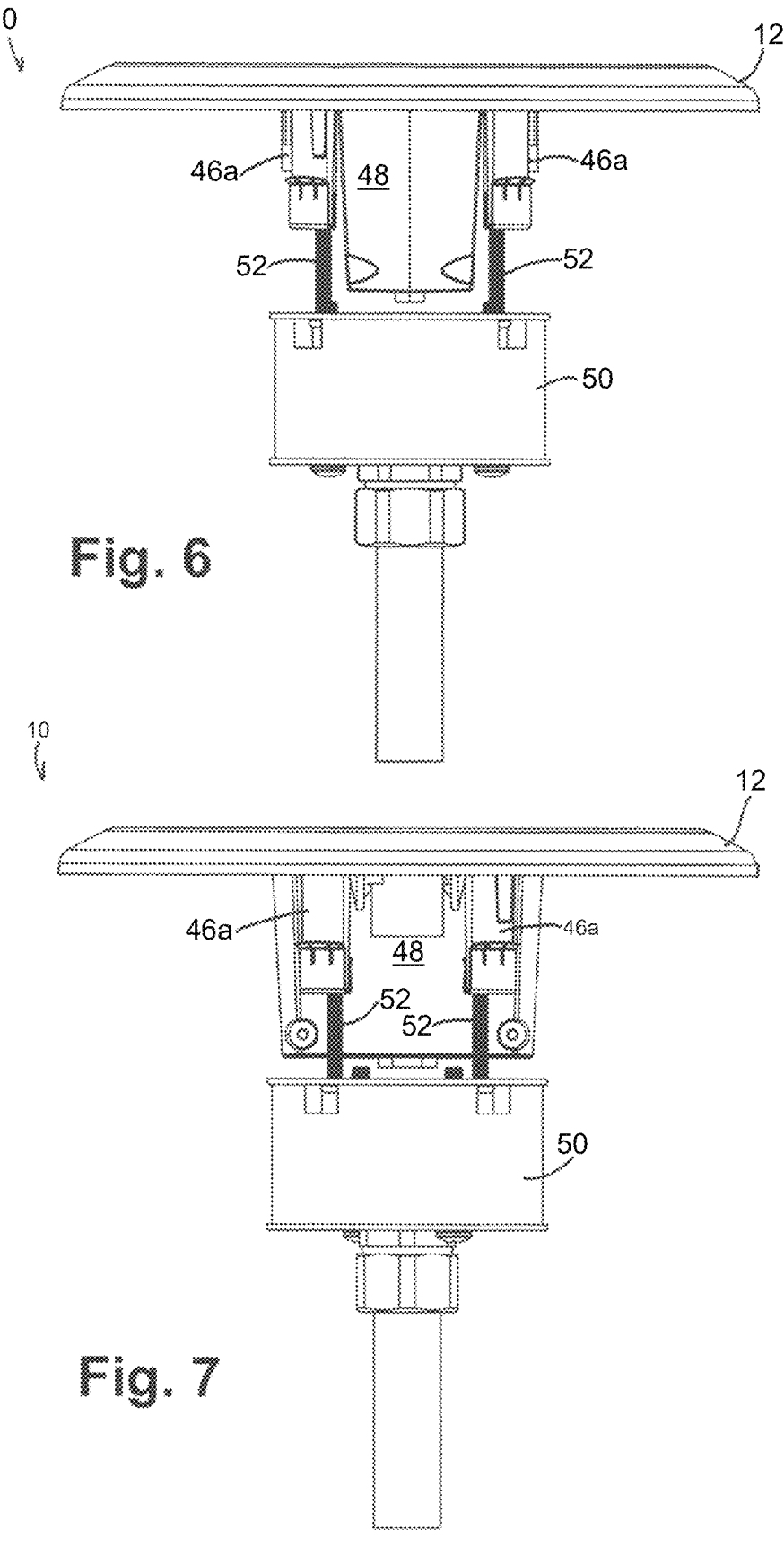
FIG. 6 is a front elevation of the electrical power unit of FIG. 1.
FIG. 7 is a side elevation of the electrical power unit of FIG. 1.
Figures 8, 9:
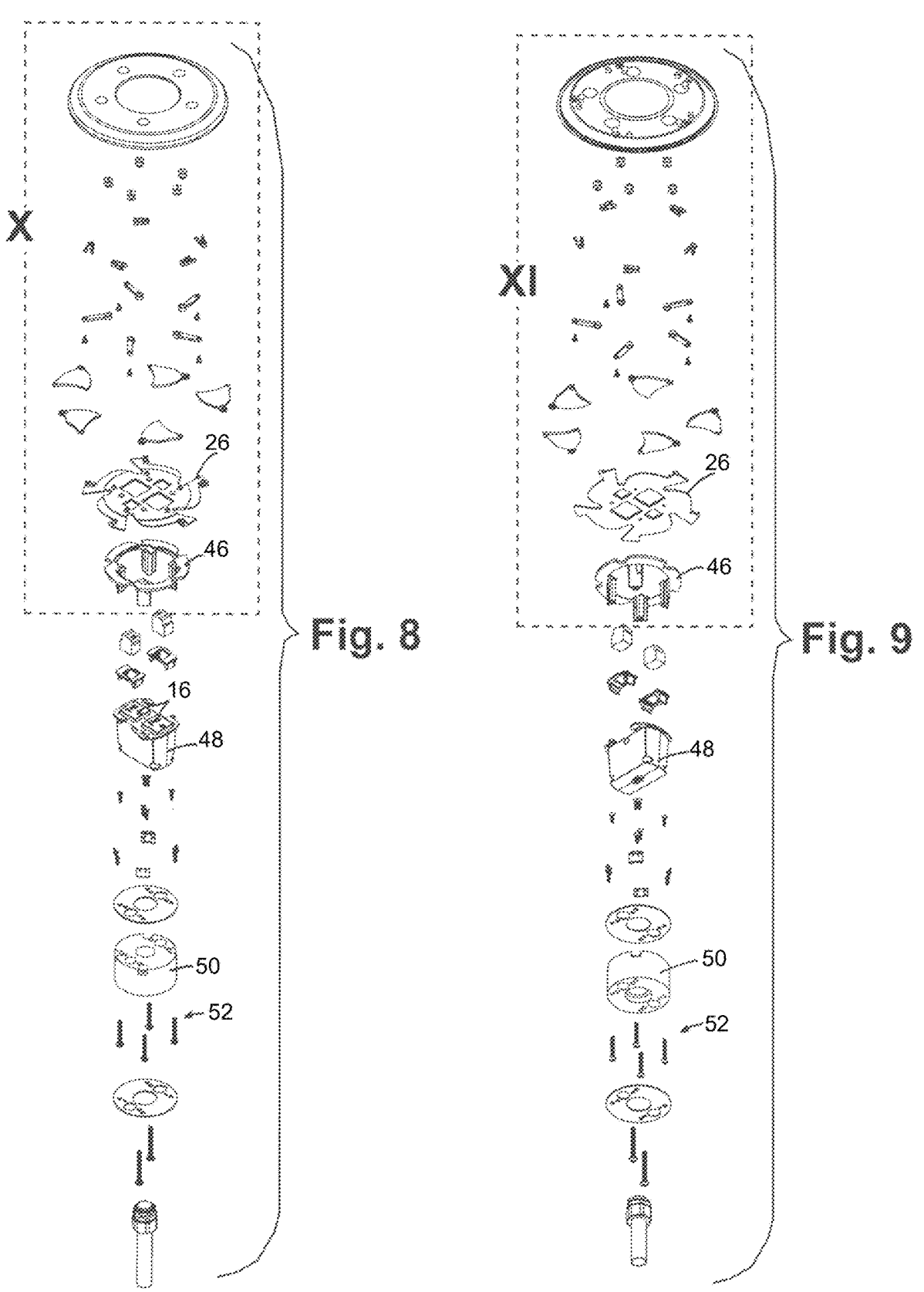
FIG. 8 is an exploded top perspective view of the electrical power unit of FIG. 1.
FIG. 9 is an exploded bottom perspective view of the electrical power unit of FIG. 1.

Referring now to the drawings and the illustrative embodiments depicted therein, a poke-through electrical power and/or electronic data unit 10 is configured for mounting in a floor or work surface (FIGS. 1 and 2). The poke-through unit 10 includes a generally planar bezel 12 in which an iris closure mechanism 14 is mounted (FIG. 2). A pair of 110V AC simplex outlets 16 and a pair of electronic data outlets 18 are accessible through an opening 20 formed in the bezel 12 when the iris closure mechanism 14 is open, such as shown in FIGS. 4B and 5C. However, the poke-through unit 10 may be sized and configured to support substantially any number and selection of electrical power and/or electronic data connectors, wiring pass-throughs, and the like. As will be described in more detail below, iris closure mechanism 14 includes a plurality of pivotably mounted vanes 22 that move in a synchronized manner, such as shown sequentially in FIGS. 5A-5C, between a closed configuration (FIGS. 1-4A and 5A) and an open configuration (FIGS. 4B and 5C).

Figure 10:
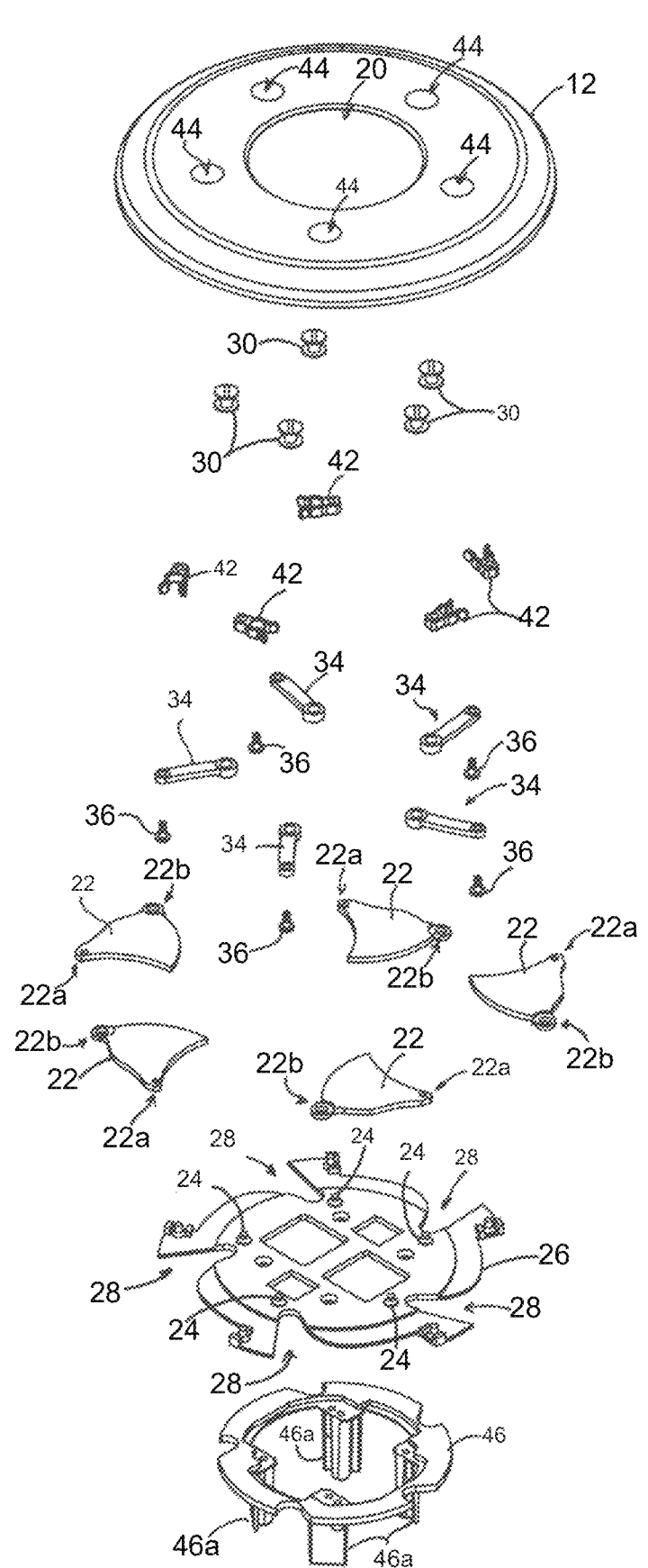
FIG. 10 is an enlarged view of the region designated X in FIG. 8.
Figure 11:
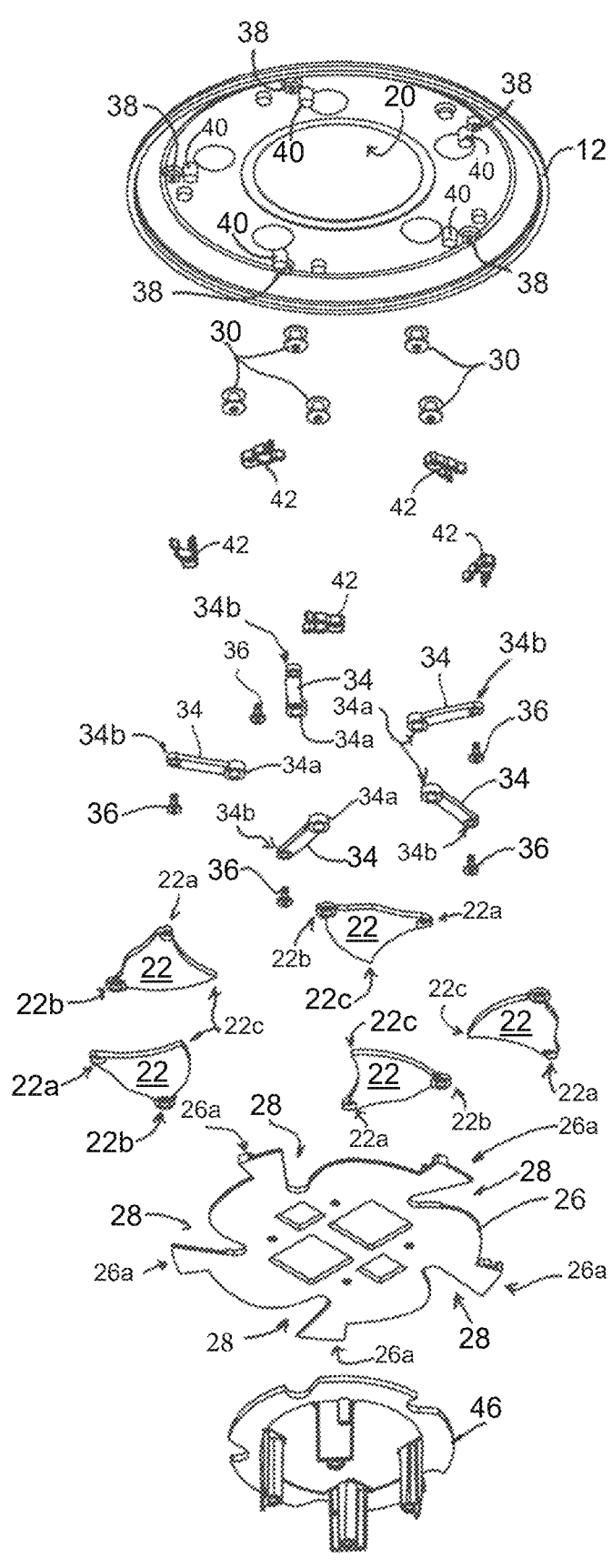
FIG. 11 is an enlarged view of the region designated XI in FIG. 9.

Each vane 22 is pivotably coupled at a pivot corner 22a to a respective pivot 24 (FIGS. 4A, 4B, and 10) that remains fixed relative to an outlet mounting plate 26. Outlet mounting plate 26 includes five contoured channels 28, one for each vane 22 in the illustrated embodiment. Each contoured channel 28 receives a respective actuation bushing 30 that is coupled to an actuation corner 22b of each vane 22. Actuation bushings 30 slide or roll along respective cam surfaces 32 that define portions of the contoured channels 28 of the outlet mounting plate 26, causing a closure tip 22c of each vane 22 to move inwardly toward the center and closed-shutter position as the bushings 30 move inwardly along the cam surfaces 32, as shown in FIG. 4A. A vane actuation arm 34 includes a bushing end 34a coupled to a respective bushing 30 and a bezel end 34b that is pivotably secured with fasteners 36 to a mount 38 along an underside of bezel 12, such as shown in FIGS. 2 and 11.

A plurality of pivot-stop studs 40 also extend downwardly from the underside of bezel 12, and are spaced a short distance from each mount 38. The pivot-stop studs 40 engage a concave side edge of respective vane actuation arms 34, between the bushing end 34a and the bezel end 34b, such as shown in FIGS. 2 and 3. Pivot-stop studs 40 permit pivoting movement of the vane actuation arms 34 between the generally radially-aligned orientations of FIGS. 2-4A when the vanes 22 are in the closed-shutter configuration, and the generally circumferentially-aligned orientations of FIG. 4B when the vanes 22 are in the open-shutter configuration. In the open-shutter configuration, the heads of the fasteners 36 are received in the resilient jaws of respective spring-latches 42, which are mounted to respective outboard arm tips 26a of the outlet mounting plate 26. This causes the shutter mechanism 14 to maintain the vanes 22 in the open-shutter configuration until sufficient rotational force is applied to the bezel 12 in the opposite direction (counterclockwise as viewed from above in FIG. 4B) to remove the heads of the fasteners 36 from the resilient jaws of the spring-latches 42 as shown in FIG. 4A. Shutter mechanism 14 thus allows a relatively small range of pivoting or rotating motion of the bezel to cause full opening and full closing of the vanes 22, and provides a detent function in at least the full open position. Optionally, a set of openings or gripping elements 44 may be provided along the bezel to facilitate manual grasping of the bezel 12 to facilitate the rotational motion needed to open or close the vanes 22.

Outlet mounting plate 26 and outlets 16 and 18 are prevented from rotating with bezel 12 and the other moving components described above by a mounting piece 46 that is fixedly coupled to an underside of the outlet mounting plate 26. Mounting piece 46 includes four downwardly-extending legs 46a that are disposed around an outlet housing 48 and are coupled to a generally cylindrical housing 50 by four respective threaded height-adjustable fasteners 52. Threaded fasteners 52 provide height and angle adjustment capability such as in a manner more fully described in commonly-owned U.S. provisional patent application, Ser. No. 62/717,604, filed Aug. 10, 2018, and corresponding U.S. patent application Ser. No. 16/536,471, filed Aug. 9, 2019, now U.S. Pat. No. 10,770,875, issued Sep. 8, 2020, which are hereby incorporated herein by reference in their entireties.

Figure 12:
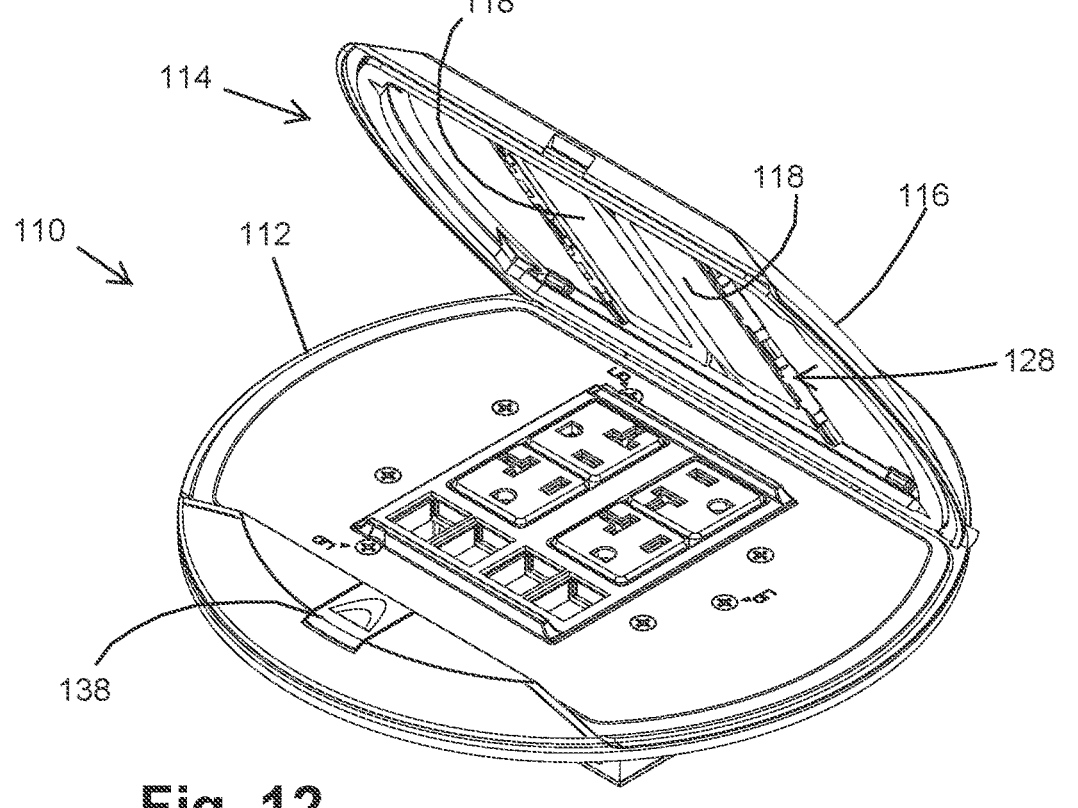
FIG. 12 is a top perspective view of another poke-through electrical power unit in accordance with the present invention, having a flush-closure shutter mechanism shown with its main door in an open position and the shutter mechanism in the closed configuration.
Figure 13:
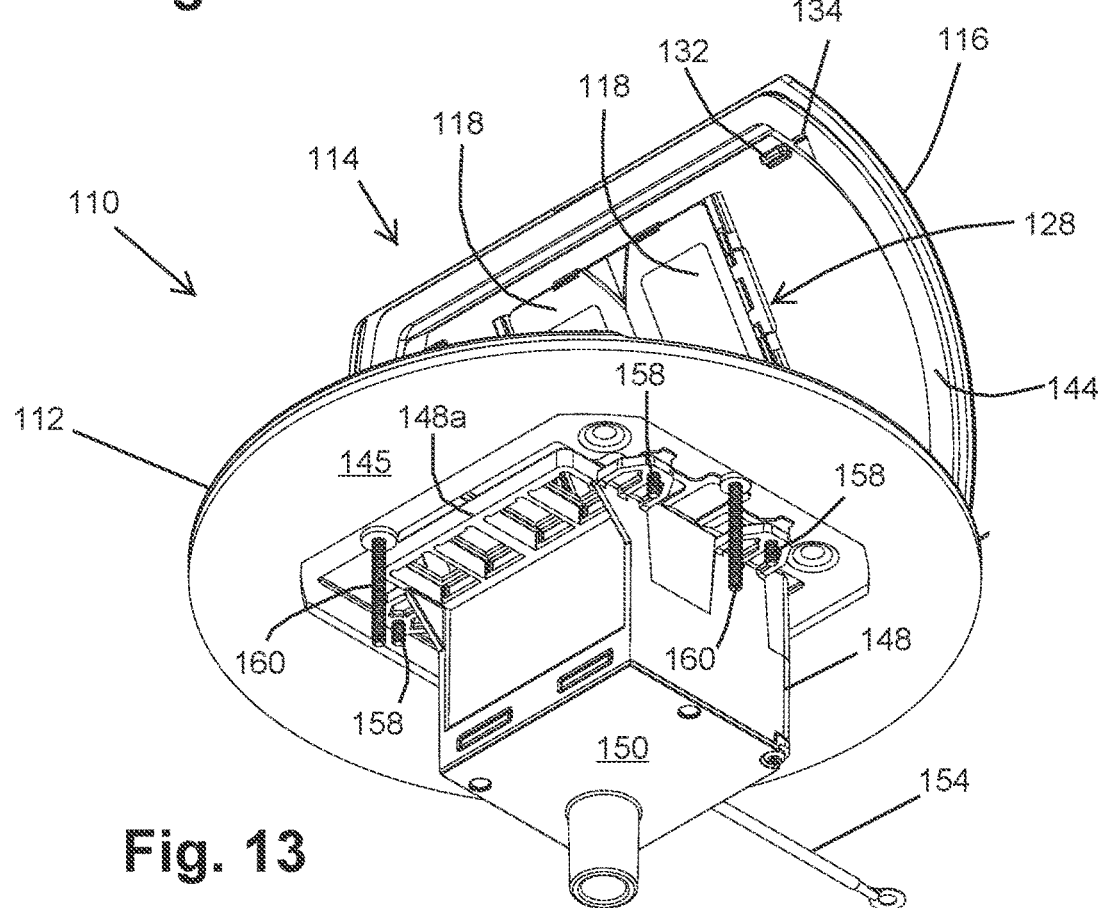
FIG. 13 is a bottom perspective view of the poke-through electrical power unit of FIG. 12.
Figures 14, 15, 16:
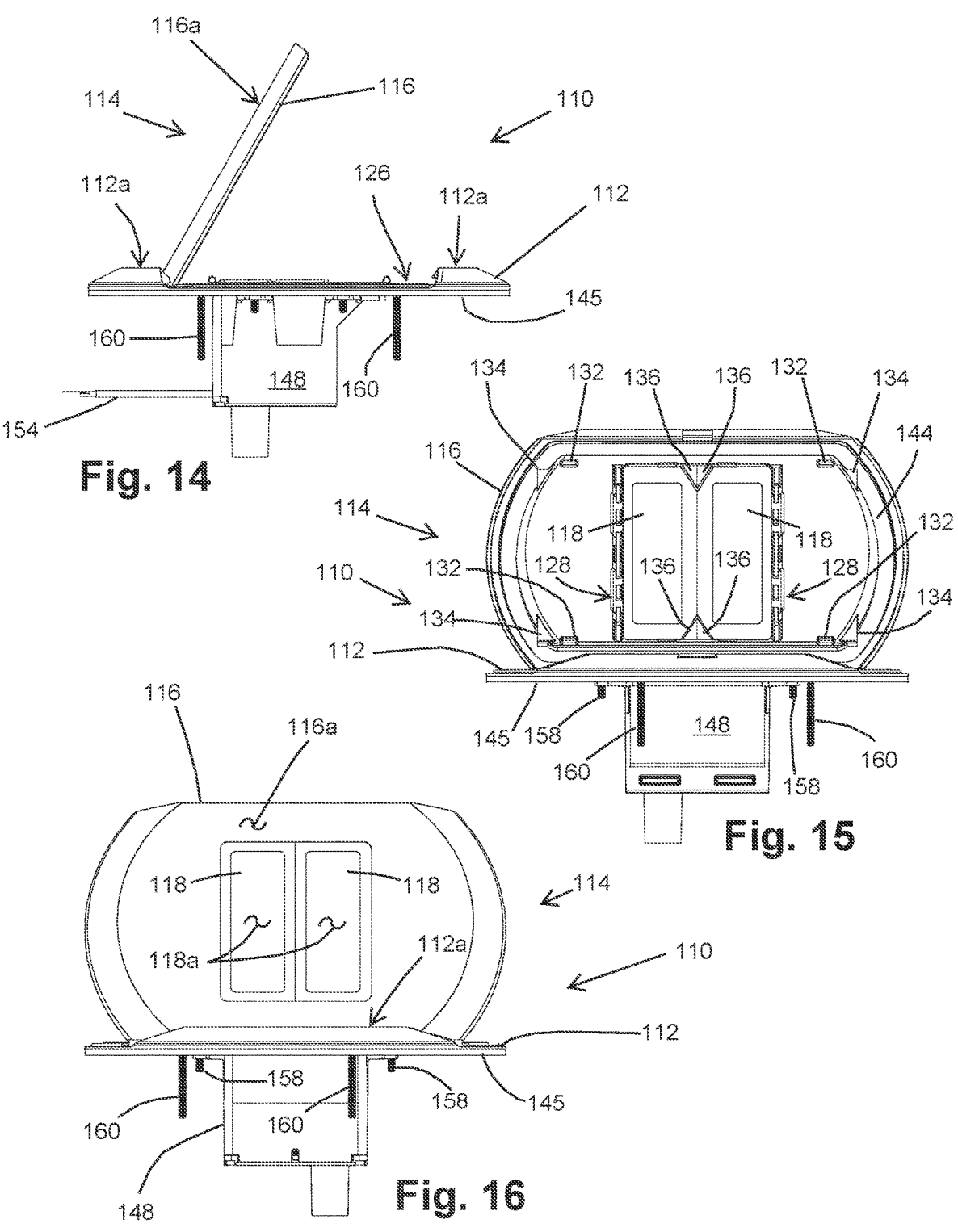
FIG. 14 is a right side elevation of the poke-through electrical power unit of FIG. 12.
FIG. 15 is front elevation of the poke-through electrical power unit of FIG. 12.
FIG. 16 is rear elevation of the poke-through electrical power unit of FIG. 12.
Figures 17A, 17B, 17C:
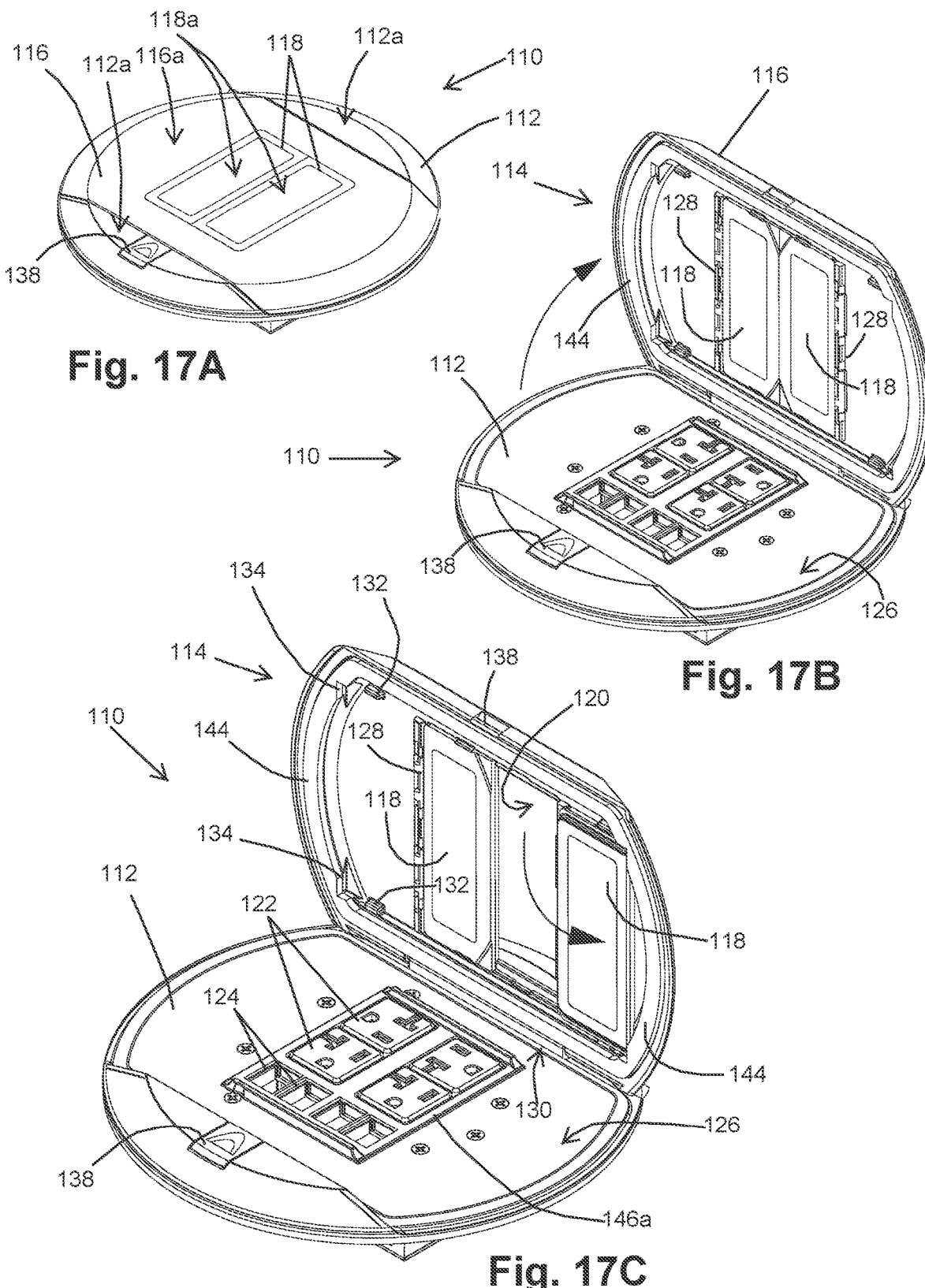
FIG. 17A is another top perspective view of the poke-through electrical power unit of FIG. 12, with its main door and shutter mechanism in the closed configuration.
FIGS. 17B-17E are additional top perspective views of the poke-through electrical power unit of FIG. 12, depicting four steps of opening the shutter mechanism and closing the main door with the shutter mechanism open.
Figures 17D, 17E:
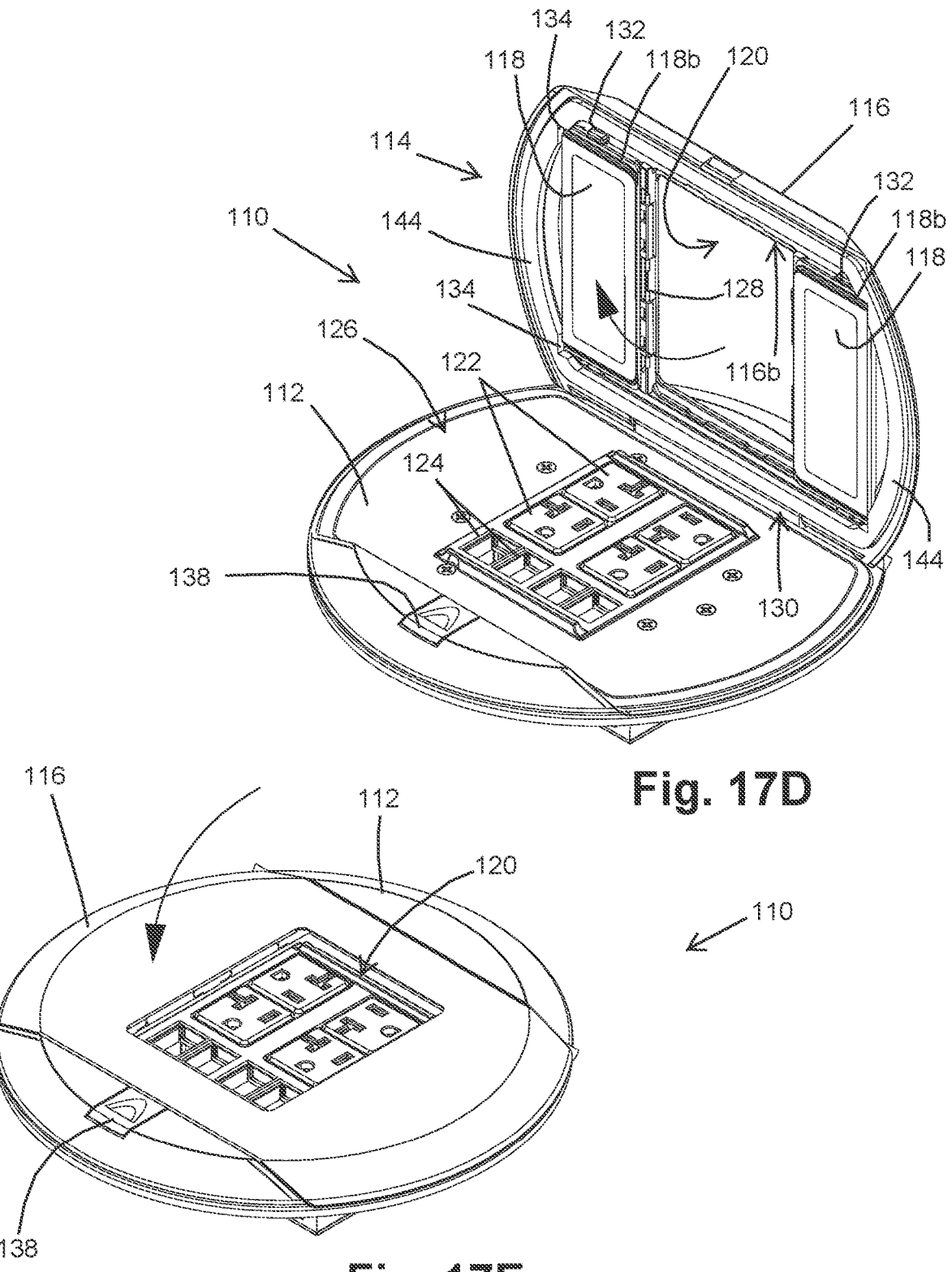
Figure 18:
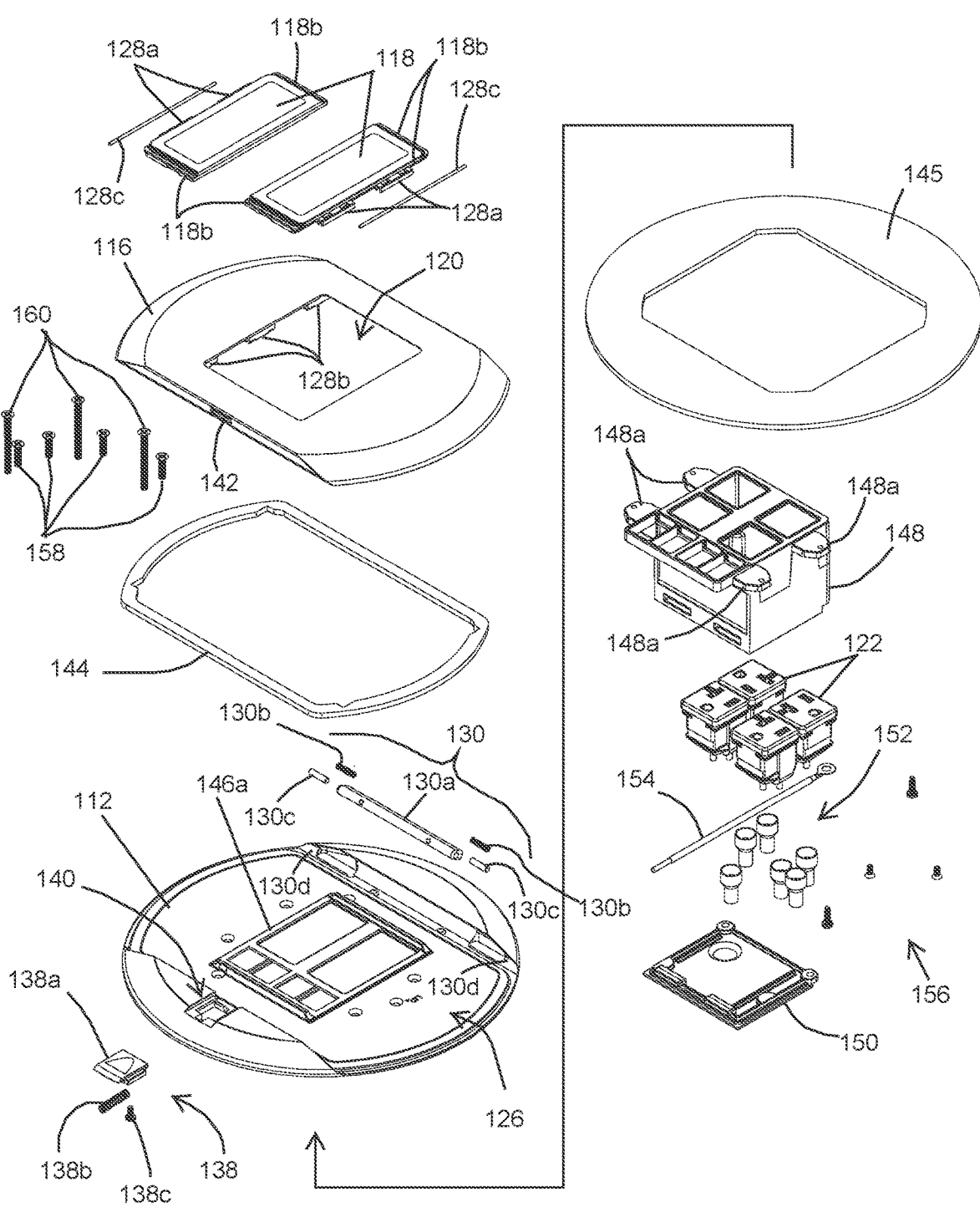
FIG. 18 is an exploded top perspective view of the poke-through electrical power unit of FIG. 12.

Referring now to FIGS. 12-18, another electrical power and/or electronic data unit 110 is provided for mounting in a floor or work surface, and includes a bezel 112 supporting a closure mechanism 114 that includes a main pivoting door 116 and a pair of pivotable shutter doors 118 that selectively close an opening 120 formed in a central region of the main pivoting door 116 (FIGS. 17C-18). Shutter doors 118 have upper surfaces 118a that are substantially flush and coplanar with an upper surface 116a of main door 116 when the shutter doors 118 are closed as shown in FIGS. 12 and 13. Similarly, the upper surface 116a of main door 116 and the upper surfaces 118a of the shutter doors 118 are substantially flush and coplanar with an upper surface 112a of the bezel when the main door 116 and shutter doors 118 are closed as shown in FIG. 12. In this way, the bezel 112, main door 116, and shutter doors 118 present a substantially smooth planar surface when the main door 116 and shutter doors 118 are closed, while precluding access to electrical outlets 122 and/or electronic data outlets 124 that are mounted in a recessed central region 126 of the bezel 112, such as shown in FIGS. 12 and 17B-17D. If desired, one of the shutter doors may be fully opened while the other remains fully closed, and the main door 116 may still be opened and fully closed as desired.

To achieve the flush-mount arrangements described above, shutter doors 118 are pivotally attached to opposite sides of the opening 120 with respective hinges 128 with pivot axes that lie in a plane spaced below the upper surface 116a of main door 116, which plane is also spaced below the upper surfaces 118a of the shutter doors 118 when the shutter doors 118 are closed. Similarly, the main door 116 is pivotally attached to the bezel 112 with a hinge 130 having a pivot axis that lies in a plane that is spaced below the upper bezel surface 112a, permitting the main door's upper surface 116a to lie flush with the upper bezel surface 112a when the main door 116 is closed, without the hinge 130 protruding above the upper surfaces 112a, 116a.

In the illustrated embodiment of FIGS. 12-18, and as best shown in FIG. 18, shutter door hinges 128 are three-part hinges including shutter hinge portions 128a, main door hinge portions 128b, and hinge pins 128c pivotably coupling the shutter hinge portions 128a to the main door hinge portions 128b. Hinge portions 128a, 128b may be made of resilient material and define C-shaped or hook-shaped channels that snap-fit onto respective portions of each hinge pin 128c to pivotably secure the shutter doors 118 to the main door 116 at opposite sides of the opening 120. Both hinge portions 128a, 128b may be unitarily formed with the shutter doors 118 and the main door 116, respectively, although other constructions are equally possible, without departing from the spirit and scope of the present invention.

The main door hinge 130 includes an elongate central hinge shaft 130a that attaches to the main door 116 and includes hollow opposite end portions that receive respective coil springs 130b that bias respective hinge pins 130c that engage respective pin-receivers 130d of the bezel 112 at a rear portions of the recessed central region 126, as best shown in FIG. 18. The central hinge shaft 130a may be secured to the main door 116 with fasteners, adhesive, ultrasonic welding, or the like, and could be unitarily formed with the main door 116 or with the bezel 112.

As best shown in FIGS. 17C-17E, the shutter doors 118 are sized and shaped to fit within the footprint (the outer periphery) of the main door 116 and within the recessed region 126 of the bezel 112, even when the shutter doors 118 are fully opened to leave the outlets 122, 124 accessible with the main door 116 closed as shown in FIG. 17E. A bottom or interior surface of the main door 116 includes a set of triangular recesses 134 (FIG. 15) that are formed in the main door 116 and a seal, described below. The recesses 134 that receive respective corners of the shutter doors 118 in their fully open position (FIGS. 17C and 17D). Similarly, shutter doors 118 have thinner corner regions 136 (FIG. 15) that correspond to the triangular recesses 134 to ensure that the shutter doors 118 can lie flush against the interior surface of the main door 116. This permits the main door 116 to be fully closed regardless of whether the shutter doors 118 are fully open or fully closed.

A set of detent tabs 132 extend downwardly from an inner or bottom surface of the main door 116, on opposite sides of the opening 120, such as shown in FIGS. 13, 15, and 17B-17D. Detent tabs 132 are engaged by the respective shutter doors 118 in their fully open position, so that the shutter doors 118 are each retained in their fully open position by respective detent tabs 132, such as shown in FIG. 17D. Thus, the detent tabs 132 prevent the shutter doors 118 from falling out of their fully open positions due to gravity when the main door 116 is being initially opened, or when the main door 116 is being closed from an open position. A spring-loaded main door latch 138 is mounted at a recess 140 in a forward end region of the bezel 112, and includes a latch-release 138a that is biased toward the main door 116 by a spring 138b, and is retained at the bezel by a fastener 138c (FIG. 18). A detent recess 142 located at the forward end of the main door 116 engages the latch-release 138a as the main door 116 is pivoted closed, causing the latch-release 138a to momentarily move outboard against the force of spring 138b and then snap back into position to fully engage the detent recess 142 and secure the main door 116 closed. To open the door 116, a user may draw the latch-release 138a outboard to disengage the door's detent recess 142, so that the main door 116 is free to be manually raised. Optionally, a resilient seal or other biasing member will force the main door 116 upwardly a short distance upon release of the latch-release 138a, to facilitate fully raising the main door 116. Other styles of latch are also envisioned, such as a rotatable partial-disc that selectively blocks and unblocks a space where an edge region of the door passes during initial opening and final closing movements, as described below in connection with another embodiment.

When main door 116 and shutter doors 118 are closed, a set of seals limit or prevent the intrusion of spilled liquids, dirt, and other contaminants into the outlets 122, 124 and/or into interior regions of the electrical power and/or data unit 110. A main door seal 144 is mounted along the lower surface of the main door 116, just inboard of a perimeter edge thereof. The main door seal 144 is shaped to sealingly engage a perimeter region of the recessed central region 126 of the bezel 112, and defines portions of the triangular recesses 134 that receive corners of the shutter doors 118, as noted above. Main door seal 144 is compressed between the bottom or interior surface of the main door 116 and the top surface of the recessed central region 126 of the bezel 112 when the main door 116 is closed, and may provide an initial lifting effect for the main door when the latch 138 is released. Optionally, it is envisioned that other main door sealing arrangements may be used to prevent or limit the intrusion of liquids or other contaminants past the perimeter interface of the main door 116 with the recessed central region 126 of the bezel 112. An additional bezel seal 145 (FIGS. 13-16 and 18) is provided beneath the bezel and engages a floor surface, work surface, or the like, to reduce or prevent the intrusion of contaminants beneath the bezel 112.

Shutter doors 118 have perimeter shoulder regions 118b, which are outboard of the shutter doors' upper surfaces 118a and recessed in a plane slightly below that of the upper surfaces 118a. Shoulder regions 118b are fitted or formed with seals or sealing material that establishes a liquid-resistant and contaminant-resistant seal with the interior perimeter portion 116b of the main door 116 that defines the central opening 120 (FIG. 17D). Inboard edges of the shutter doors 118, opposite the shutter hinge portions 128a, close tightly together as shown in FIGS. 12, 13, and 15-17B, such that a liquid-resistant and contaminant-resistant seal is established between the shutter doors 118 when they are fully closed. Optionally, it is envisioned that other shutter door sealing arrangements may be used to prevent or limit the intrusion of liquids or other contaminants past the perimeter interface of the shutter doors 118 with each other, and with the interior perimeter portion 116b of the main door 116.

Figures 19, 20:
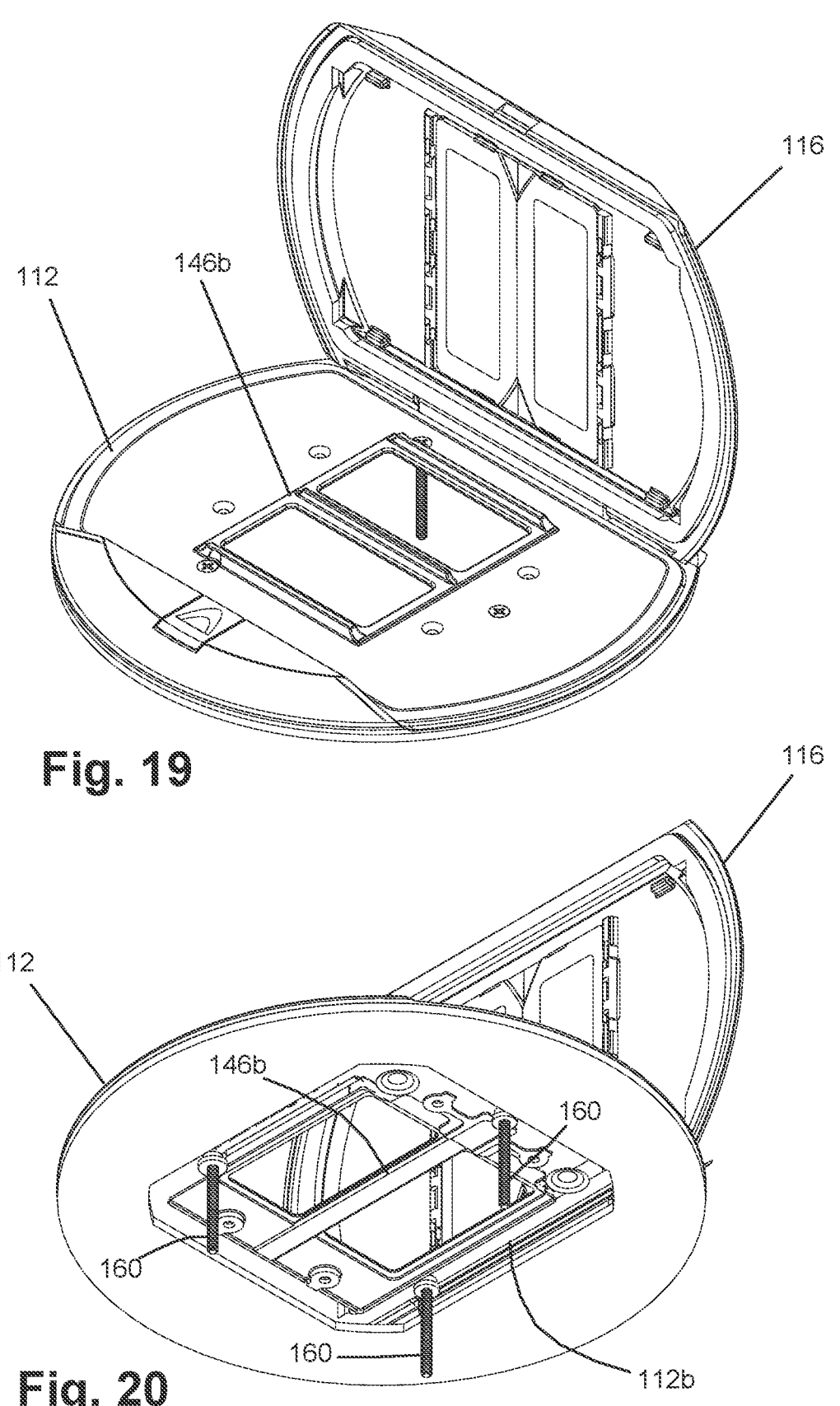
FIG. 19 is a top perspective view of another bezel with flush-closure shutter mechanism compatible with the poke-through electrical power unit of FIG. 12, shown with its main door in an open position and the shutter mechanism in the closed configuration.
FIG. 20 is a bottom perspective view of the flush-closure shutter mechanism of FIG. 19.

The outlets 122 and 124 are framed by an outlet frame 146a that is secured within a central opening of the bezel 112 (FIG. 18). Optionally, the outlet frame 146a establishes a contaminant-resistant seal with the bezel 112 at its central opening 112b (FIG. 20), and may also establish seals with the outlets 122, 124. The outlet frame 146a is replaceable at the bezel 112, and may be exchanged for another outlet frame 146b (FIGS. 19 and 20) having a different configuration for receiving different numbers and/or types of power and/or data outlets. An outlet housing 148 contains at least the high voltage AC receptacles 122, and is enclosed by a bottom cover 150. Referring to FIG. 18, other components associated with the outlet housing 148 and the outlets 122 include a plurality of crimp connectors 152, a ground conductor 154 that can be shared by the multiple outlets 122, and fasteners 156 for securing the bottom cover 150 and establishing other connections.

Four threaded fasteners 158 (FIG. 18) pass through respective openings in the bezel 112 to engage openings in four respective mounting tabs 148a of the outlet housing 148 and serve to secure the outlet housing 148 to the outlet frame 146a and to the underside of the bezel 112 such as shown in FIG. 13. Three additional threaded fasteners 160 pass through respective openings in the bezel 112, and pass through openings in the outlet frame 146a, 146b (FIGS. 13 and 20), and are used to secure the outlet frame 146a, 146b to the bezel 112, and may also be used to secure the outlet frame 146a, 146b to an electrical box (not shown) or other structure beneath the bezel 112. Thus, by removing the three fasteners 160, the bezel 112, the outlet frame 146a, 146b, the outlets 122, 124, and the outlet housing 148 may be removed as a unit, such as to permit replacement or servicing the outlets (after removing additional fasteners 158), or for providing a different configuration of outlets, or for changing the wiring directed into the outlet housing 148 from below.

Accordingly, the electrical power and/or data unit 110 provides a low-profile access point for electrical power and/or electronic data, and can be installed in floors including walking areas, or in work surfaces or other surfaces in work areas. The unit's bezel's main door can be opened to provide full access to outlets and fasteners used to secure the bezel in place, and include its own shutter doors that can be closed to preclude access to the outlets while sealing against contaminants, and that can be fully opened to provide access to the outlets even when the main door is fully closed. Moreover, it should be appreciated that the bezel 212 may be adapted for use in a poke-through power and/or data unit, such as the unit 10 described above, without departing from the spirit and scope of the present invention.

Referring to FIGS. 21-25, 26-27, 28-31, and 32-34, other bezel covers 212, 312, and 412 are envisioned that can be used to cover, protect, and provide selective access to electrical power and/or electronic data outlets mounted at an outlet housing (such as the outlet housing 148 described above), or associated with a poke-through unit similar to unit 10 described above, or the poke-through power and/or electronic data unit 310 of FIGS. 28-31, described below. Many of the components and functions of the bezel covers described below are similar to components and functions described above, such that the following discussion will focus primarily on notable differences of the bezel covers 212, 312, and 412.

Figures 21, 22, 23:
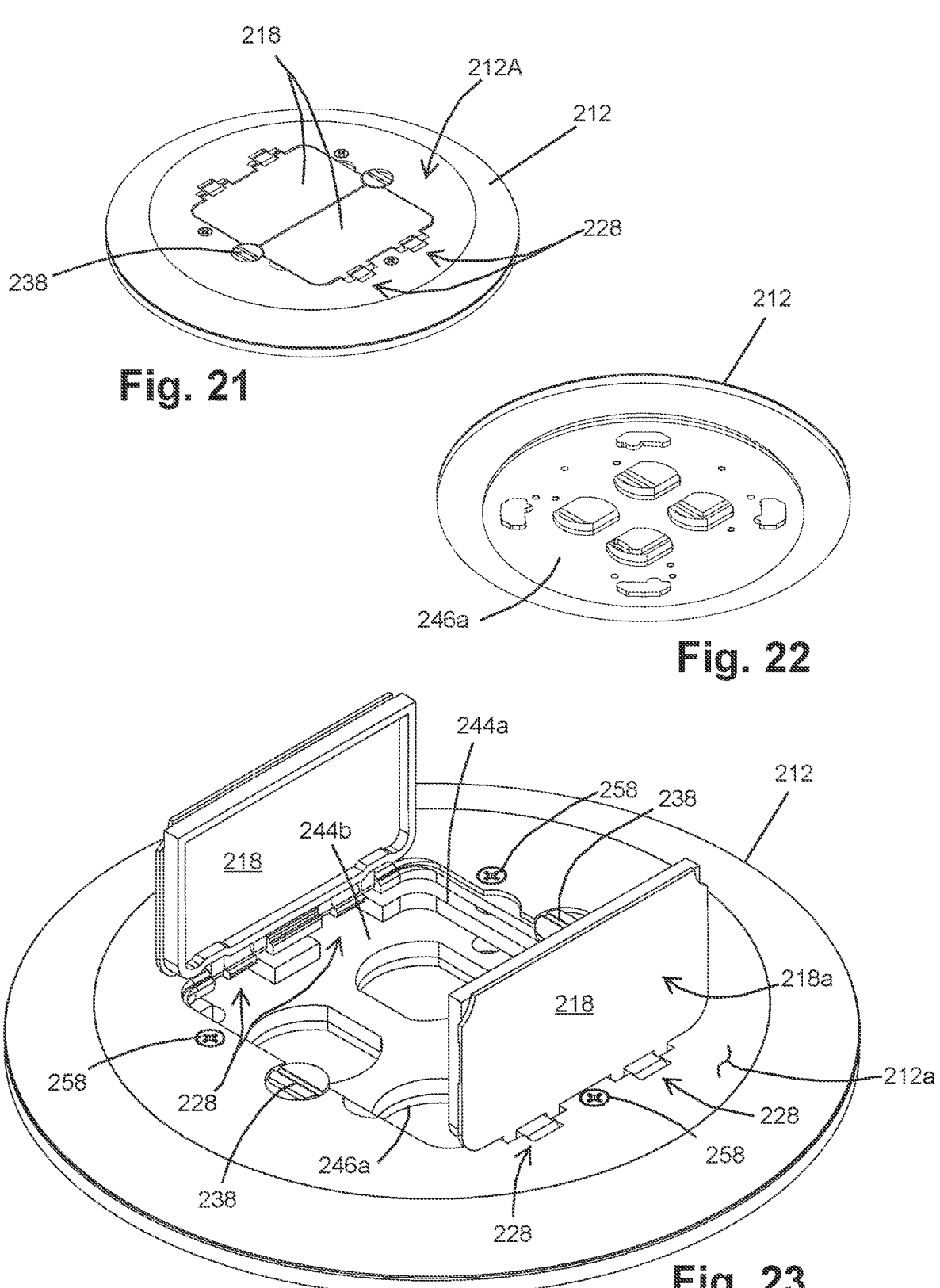
FIG. 21 is a top perspective view of a bezel with dual shutter mechanism compatible with the poke-through electrical power unit of FIG. 12, shown with its shutters in a closed configuration.
FIG. 22 is a bottom perspective view of the bezel with dual shutter mechanism of FIG. 21.
FIG. 23 is another top perspective view of the bezel with dual shutter mechanism of FIG. 21, shown with its shutters in an open configuration.
Figure 27:
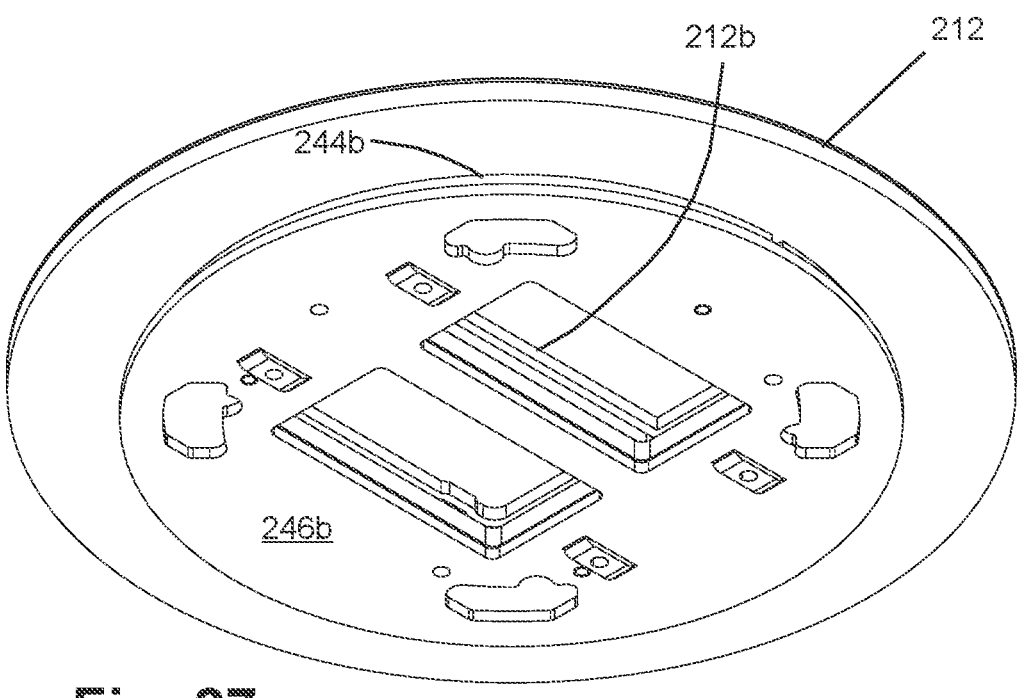
FIG. 27 is a bottom perspective view of the bezel with dual shutter mechanism of FIG. 26.

A dual-door bezel cover 212 (FIGS. 21-25) includes a pair of shutter doors 218 that open upwardly (FIG. 23) to expose a plurality of outlets (not shown) at respective outlet openings 222 in an outlet frame plate 246a. An upper gasket 244a and lower gasket 244b (FIG. 25) are sandwiched between the outlet frame plate 246a and the underside of the bezel 212 and secured by threaded fasteners 258 that extend downwardly through a top surface 212a of the bezel 212 and threadedly engage respective openings formed in the outlet frame plate 246a, such as shown in FIGS. 22 and 23, and also in FIGS. 26 and 27. Fasteners 258 may be fitted with O-ring gaskets 258a (FIG. 24) to resist intrusion of contaminants below the bezel's top surface 212a and in a central opening 212b of the bezel 212 (FIG. 27). The shutter doors 218 have upper flanges 218b that may establish a seal with the bezel 212 when the doors 218 are closed so that the doors' upper surfaces 218a are flush with the top surface 212a of the bezel 212. Additional fasteners 260 (FIG. 24) may be used to secure the outlet frame plate 246a to an electrical box or other structure (not shown). The outlet frame plate 246a of FIGS. 22-25 may be replaced with other outlet frame plates such as the plate 246b of FIGS. 26 and 27, which has a different configurations for supporting different types and/or quantities of electrical power and/or electronic data outlets.

Figure 24:
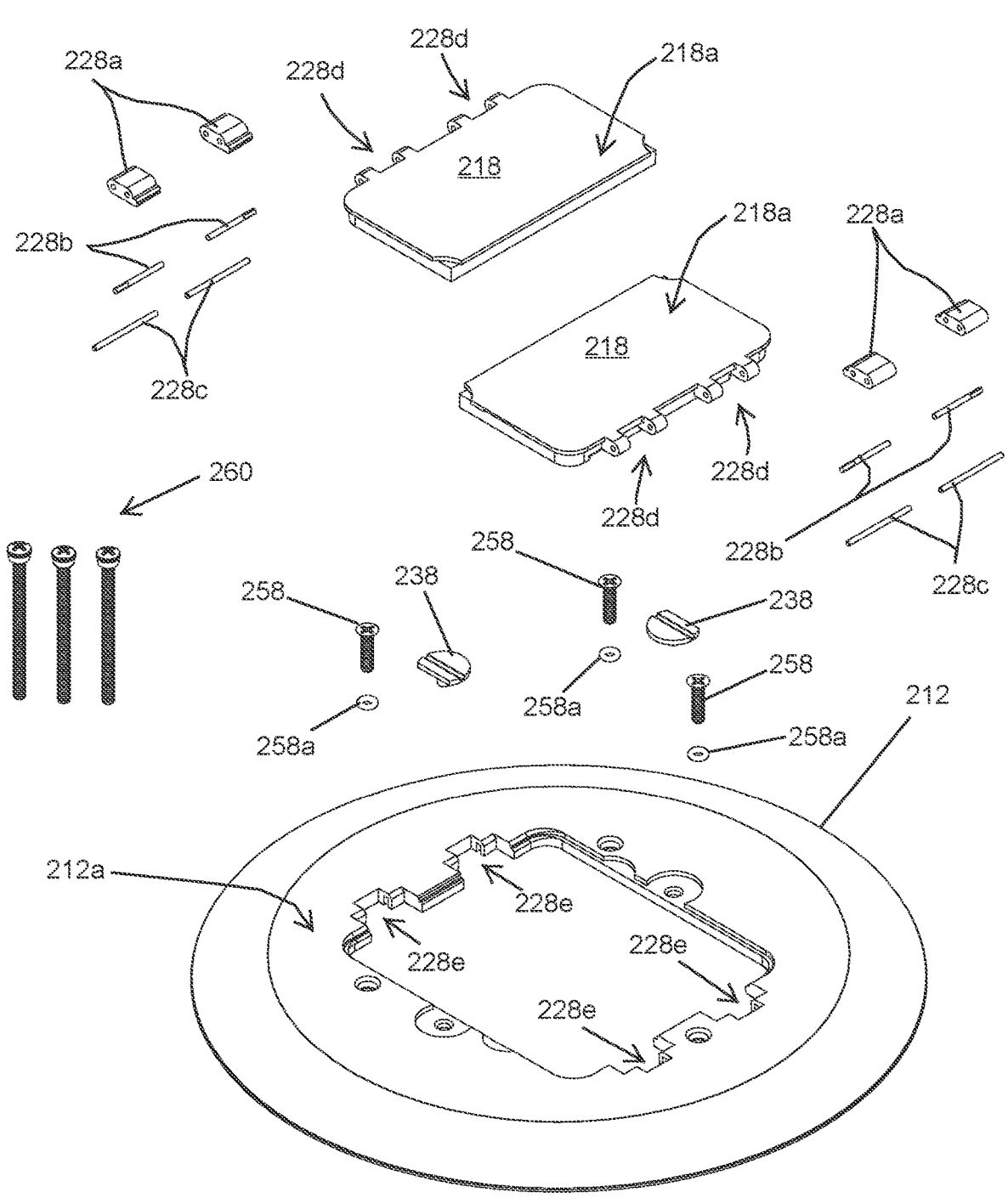
FIG. 24 is an exploded view of the bezel and dual shutter mechanism components of FIG. 21.
Figure 25:
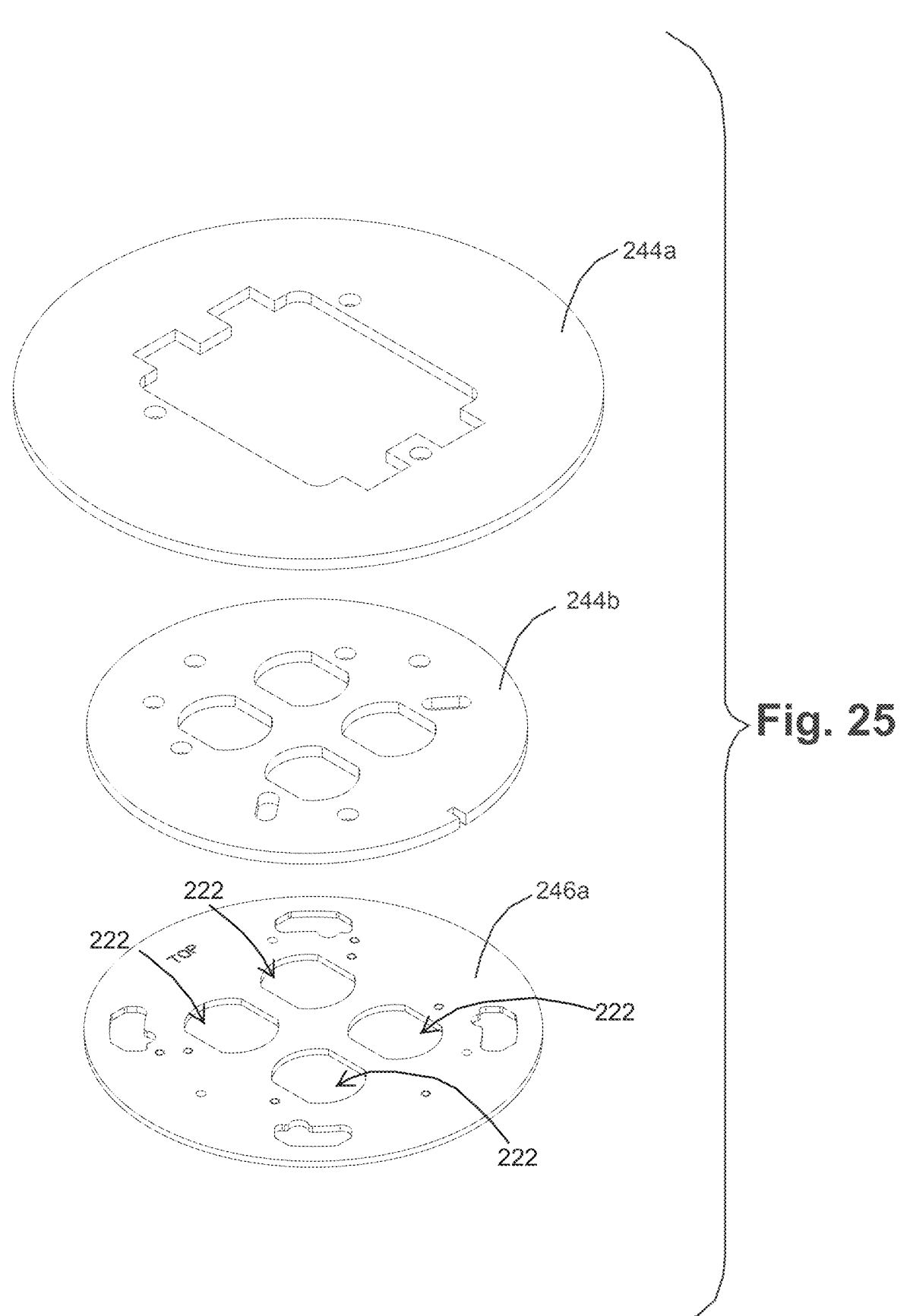
FIG. 25 is an exploded view of lower components of the bezel with dual shutter mechanism of FIG. 21.
Figure 26:
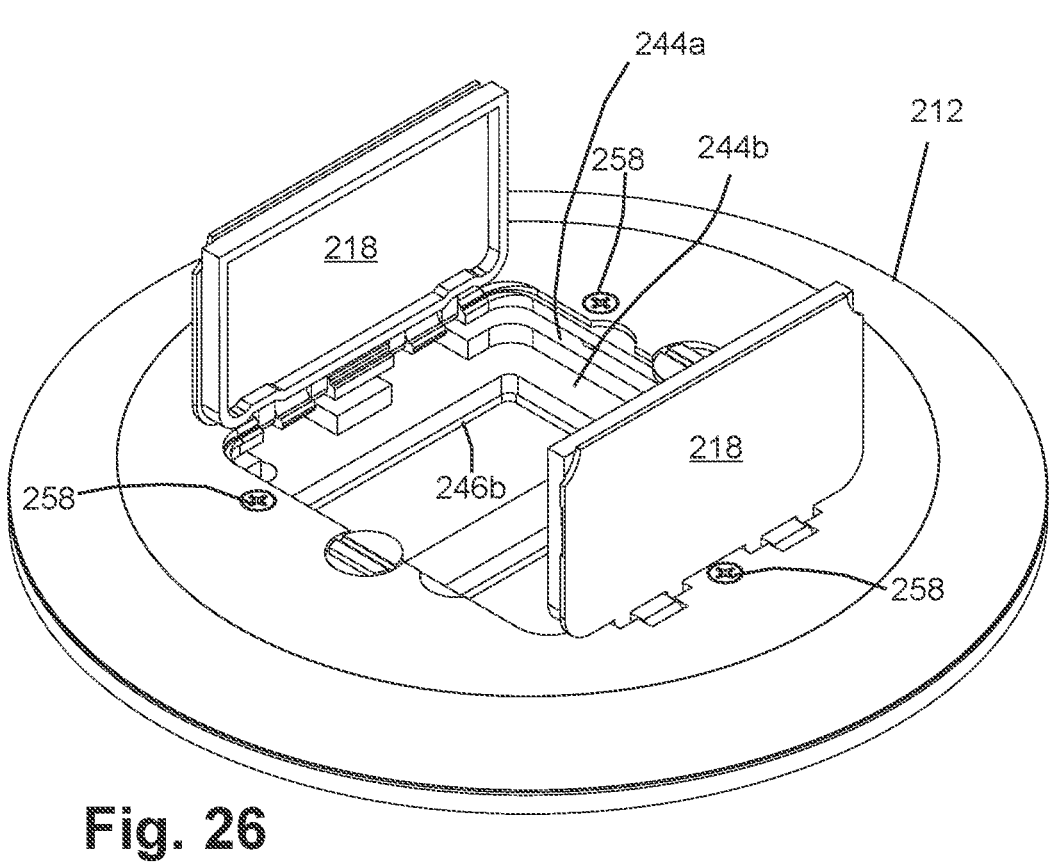
FIG. 26 is a top perspective view of another bezel with dual shutter mechanism compatible with the poke-through electrical power unit of FIG. 12, shown with its shutters in an open configuration.

Shutter doors 218 are pivotally attached to the bezel with dual-axis hinges 228 that allow the shutter doors 218 to open about 180-degrees with their upper surfaces 218a directly contacting or lying directly above the top surface 212a of the bezel. Hinges 228 include intermediate hinge pieces 228a that each receive two spaced-apart hinge pins including shutter hinge pins 228b and bezel hinge pins 228c. Shutter hinge pins 228b are received in corresponding sets of pin-receivers 228d at each shutter door 218, while bezel hinge pins 228c are received in corresponding sets of pin-receivers 228e at the bezel 212, such as shown in FIG. 24. Shutter doors 218 are secured in their closed positions with rotatable partial discs 238 that selectively blocks and unblocks a space where an edge region of the door passes during initial opening and final closing movements.

Figure 31:
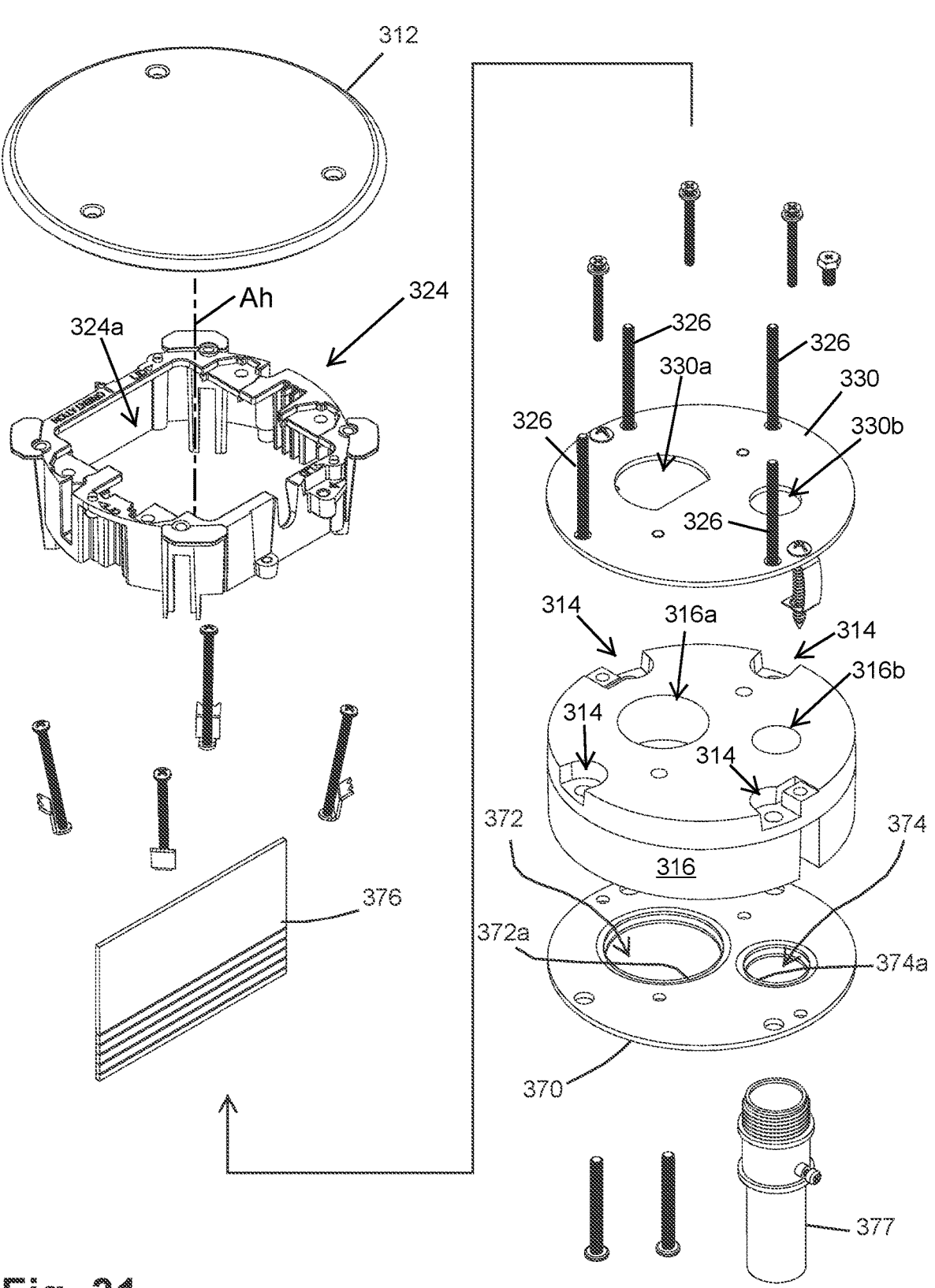
FIG. 31 is an exploded top perspective view of the poke-through electrical power unit of FIG. 28.
Figures 32, 33:
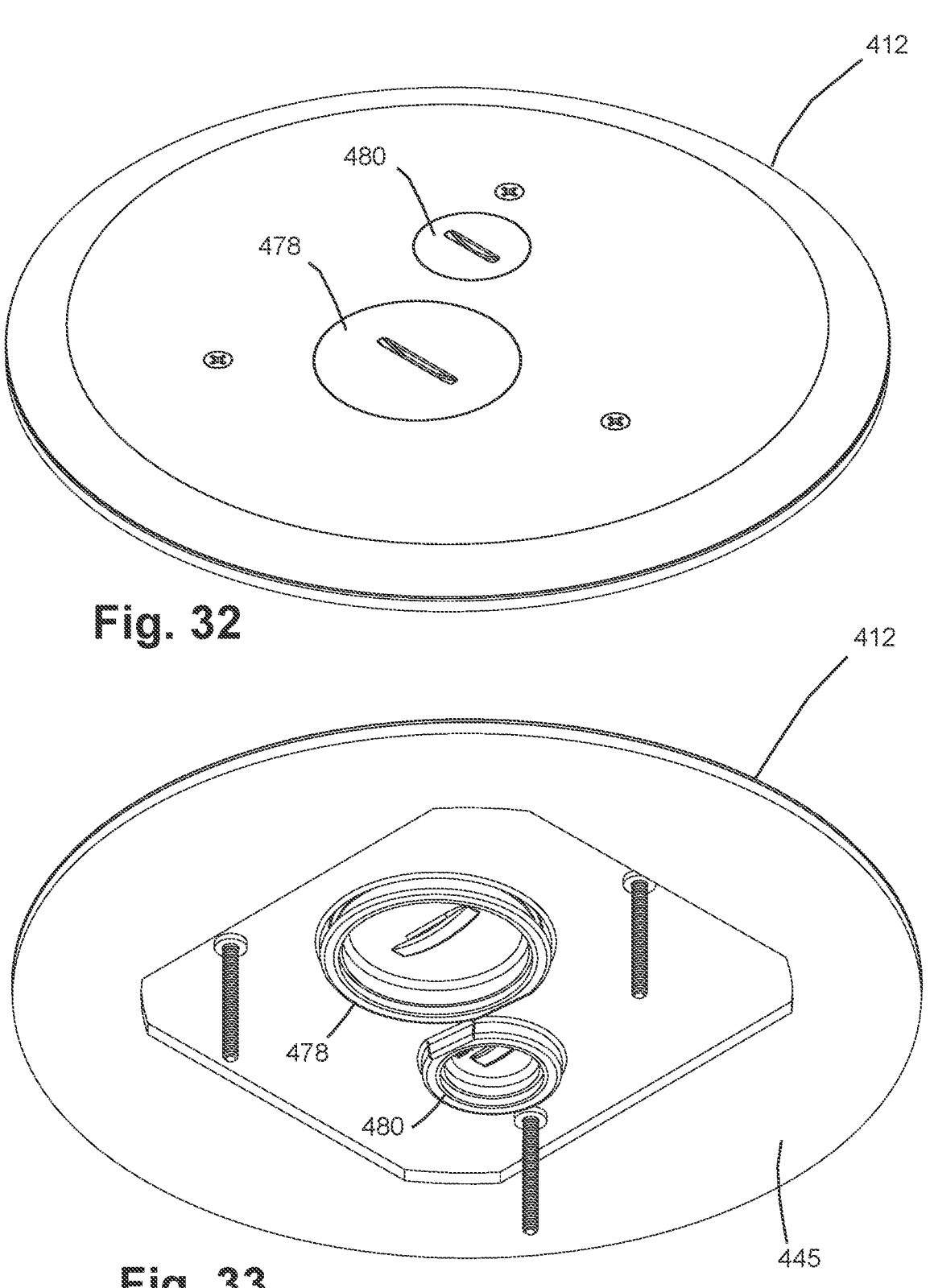
FIG. 32 is a top perspective view of a two-opening bezel assembly compatible with the poke-through electrical power unit of FIG. 28.
FIG. 33 is a bottom perspective view of the bezel assembly of FIG. 32.
Figure 34:
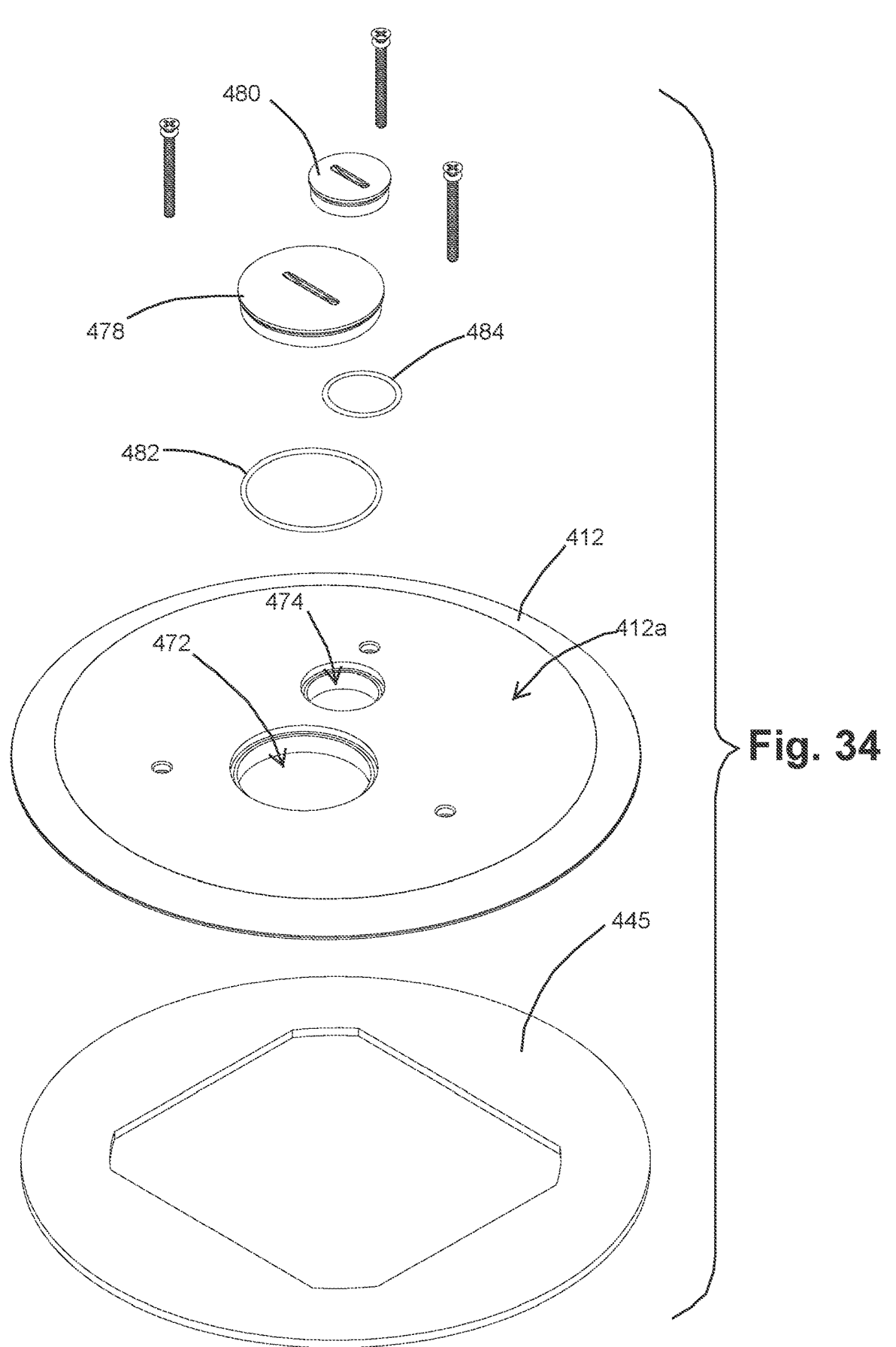
FIG. 34 is an exploded top perspective view of the bezel assembly of FIG. 32.

Turning now to FIGS. 28-31, a poke-through power and/or electronic data unit 310 is fitted with a blank cover 322, but is otherwise substantially similar to commonly-owned and co-pending U.S. patent application Ser. No. 16/536,471, filed Aug. 9, 2019, now U.S. Pat. No. 10,770, 875, which is hereby incorporated herein by reference in its entirety. Thus, an understanding of the poke-through unit 310 may be obtained with reference to the aforementioned application. In the illustrated embodiment of FIGS. 28-31, the poke-through unit includes a bottom plate 370 that defines a larger opening 372 for receiving electronic data cords (not shown) and a smaller opening 374 for receiving high voltage AC electrical power cords (not shown) that supply data signals and/or power to respective electronic data outlets and/or electrical power outlets that are accessible at a top region of the unit 310. Optionally, and as shown in FIG. 31, an isolator wall 376 is provided to ensure electrical isolation and reduce electronic interference between data receptacles and power receptacles, and between their respective cords passing upwardly through the poke-through unit 310.

Recesses 314 at the top of a fire-resistant block 316 are recessed a sufficient distance from a top plate 318 so that a lower insert 320 can "float" up or down relative to an upper housing 324, and can be set at an angle relative to the upper housing 324. For example, in the illustrated embodiment of FIGS. 28-31, when coupling fasteners 326 are fully secured for coupling the lower insert 320 to fastener receivers 328 of the upper housing 324, the fastener heads 326*a* (FIG. 29) can move freely up and down within the respective recesses 314, between a top plate 330 and the bottom of each recess 314, such that a longitudinal insert axis Ai may be misaligned with a longitudinal upper housing axis Ah (FIG. 28) by up to about 3 to 4 degrees. As a result, the lower insert 320 is also repositionable in its axial direction (along insert axis Ai) relative to the upper housing 324 by a limited distance according to the vertical spaces between the fastener heads 326*a* and the bottom surfaces of the respective recesses 314. In this way, the bore in which the poke-through unit 310 is mounted may be non-orthogonal with the upper floor surface by up to 3 to 4 degrees, while still permitting the bottom surface of an upper bezel or cover 312 to lie flush against the upper floor surface.

It will be appreciated that adjusting the depths of the recesses 314 and/or the dimensions or shapes of the fastener heads 326*a* would permit different ranges of angular and vertical adjustment of the lower insert 320 relative to the upper housing 324, as desired or needed during installation into a somewhat non-orthogonal bore. It should further be appreciated that the same or similar effect may be achieved by reversing the orientation of the coupling fasteners 326 and configuring the support at the outer outlet housing to provide a recess or cavity in which each fastener head is relatively free to move, while the opposite end of each fastener is more rigidly secured. Moreover, it is envisioned that double-headed studs may be used in place of the more traditional single-headed fasteners shown, with receiving cavities provided for loosely capturing both ends of the double-headed stud.

Referring to FIG. 31, upper housing 324 defines a pass-through opening 324*a* along the longitudinal housing axis Ah. Top plate 330 defines a larger opening 330*a* that aligns with a corresponding larger opening 316*a* in the fire-resistant block 316 and the larger opening 372 formed in lower plate 370. Top plate 330 defines a smaller opening 330*b* that aligns with a corresponding smaller opening 316*b* in the fire-resistant block 316 and the smaller opening 374 formed in lower plate 370.

Figures 28, 29, 30:
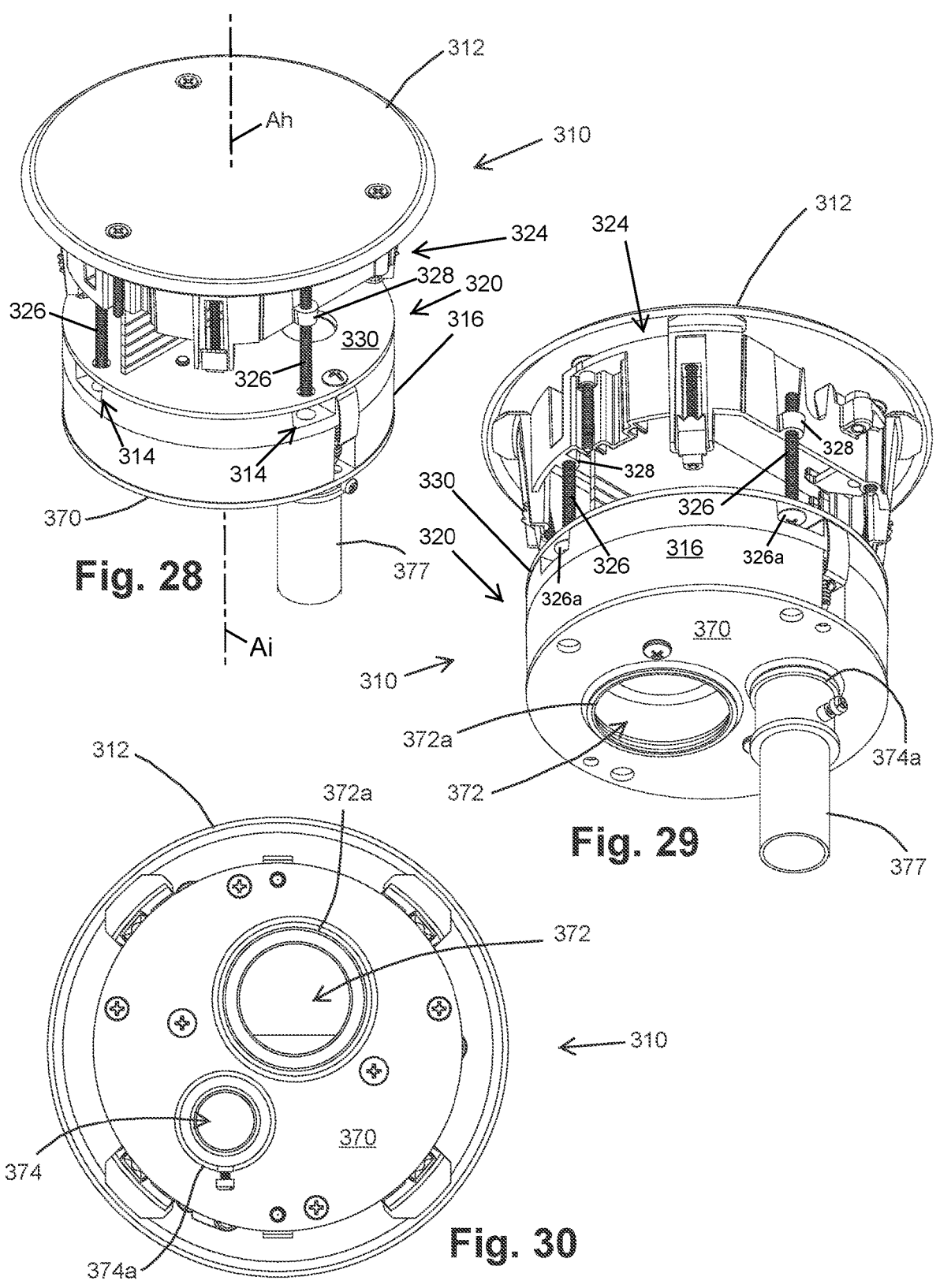
FIG. 28 is a top perspective view of another poke-through electrical power unit in accordance with the present invention, shown fitted with a blank cover.
FIG. 29 is a bottom perspective view of the poke-through electrical power unit of FIG. 28.
FIG. 30 is a bottom plan view of the poke-through electrical power unit of FIG. 28.

The openings 372, 374 are formed in the bottom plate 370 in a drawing a tapping process that results in the material of the bottom plate 370 being formed to have respective cylindrical flanges 372*a*, 374*a*, each with an internal thread for receiving a respective wire conduit having an external thread. An exemplary section of wire conduit 377 is shown in FIGS. 29-31, and is sized and threaded for attachment to the cylindrical flange 374*a* of the bottom plate, as best shown in FIG. 29.

A corresponding bezel 412 (FIGS. 32-34) has an upper surface 412*a* defining a larger opening 472 and a smaller opening 474 (FIG. 34) corresponding to the openings 372, 374 in the bottom plate 370, the openings 330*a*, 330*b* in upper plate 330, and the openings 316*a*, 316*b* in fire-resistant block 316, and also open to the pass-through opening 324*a* of upper housing 324. The openings 472, 474 permit electronic data cords and electrical power cords to be routed up from a floor surface, through the poke-through unit 310 and out into a work area, where they can be used to supply electronic data connectivity or electrical power to desired areas within the work area. Each opening 474, 476 is fitted with a correspondingly-sized cover 478, 480 that threads into the opening 474, 476. Covers 478, 480 may be fitted with corresponding O-ring gaskets 482, 484 (FIG. 34) to reduce or prevent contaminants from passing below the bezel 412. A lower gasket or bezel seal 445 is provided beneath the bezel 412 and engages a floor surface, work surface, or the like, to reduce or prevent the intrusion of contaminants beneath the bezel 412.

Thus, the poke-through unit 310 can be fitted with the pass-through bezel 412 to allow cords to be routed into and around within a work area serviced by the unit 310. The poke-through unit 310 could also be fitted with a dual-door bezel and electrical power and/or electronic data outlets, such as the dual-door bezels 112, 212 described above, or even the iris closure bezel 12. If the poke-through unit 310 will not be used for some period, it may be fitted with the blank cover 312 as shown in FIGS. 28-31. As mentioned above, it is also possible to adapt the various bezels 12, 112, 212, 312, and 412 disclosed herein to more conventional electrical installations, such as the electrical power and/or electronic data unit 110 of FIGS. 12-18.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power and/or electronic data unit for mounting in a floor or work surface, said electrical power and/or electronic data unit comprising:

an upper housing configured for mounting at an upper end portion of an opening formed in the floor or work surface, said upper housing defining a pass-through opening along a longitudinal housing axis;

an upper bezel cover mounted to an upper portion of said upper housing and configured to extend over the floor or work surface around the opening formed therein;

a lower insert spaced below said upper housing and having a longitudinal insert axis, said lower insert comprising a block of intumescent material defining a pass-through bore;

a top plate secured at an upper surface of said lower insert, said top plate and said lower insert cooperating to define a plurality of recesses; and a plurality of coupling fasteners in a circumferentially-spaced arrangement around the longitudinal housing axis, said coupling fasteners having lower end portions received and retained at respective ones of said recesses, and upper end portions received and retained at said upper housing;

wherein said coupling fasteners are each independently adjustable to move a respective portion of said lower insert toward and away from a respective portion of said upper housing, to thereby change an angular position of said lower insert relative to said upper housing so that said lower insert is positionable with the longitudinal insert axis in parallel alignment with the longitudinal housing axis, and repositionable with the longitudinal insert axis set non-parallel to the longitudinal housing axis;

wherein a depth of said recesses is such that said lower end portions of said coupling fasteners are movable a limited distance within said recesses without adjusting said coupling fasteners; and wherein said upper bezel cover is removable or openable to provide pass-through access to said pass-through opening of said upper housing and said pass-through bore of said lower insert for routing cords through the opening formed in the floor or work surface and into a work area.

2. The electrical power and/or electronic data unit of claim 1, wherein said lower insert defines first and second ones of said pass-through bores in said block.

3. The electrical power and/or electronic data unit of claim 2, wherein said upper bezel cover defines first and second bezel openings fitted with respective covers that are selectively removable or openable to expose said first and second bezel openings.

4. The electrical power and/or electronic data unit of claim 2, further comprising an isolator wall mounted in said upper housing and aligned between said first and second pass-through bores.

5. The electrical power and/or electronic data unit of claim 2, wherein said first pass-through bore is larger than said second pass-through bore, said first pass-through bore is configured to receive a plurality of low-voltage electronic data cords, and said second pass-through bore is configured to receive at least one high voltage power cord.

6. The electrical power and/or electronic data unit of claim 1, further comprising:

a top plate disposed along an upper surface of said block and defining a top plate opening aligned with said pass-through bore of said block; and a bottom plate disposed along a lower surface of said block and defining a bottom plate opening aligned with said pass-through bore of said block.

7. The electrical power and/or electronic data unit of claim 6, wherein said block defines first and second ones of said pass-through bores.

8. The electrical power and/or electronic data unit of claim 7, wherein said first pass-through bore is larger than said second pass-through bore, said first pass-through bore is configured to receive a plurality of low-voltage electronic data cords, and said second pass-through bore is configured to receive at least one high voltage power cord.

9. The electrical power and/or electronic data unit of claim 7, wherein said top and bottom plates define respective first and second ones of said top and bottom plate openings, said first and second ones of said top plate openings aligned with said first and second pass-through bores, and first and second ones of said bottom plate openings aligned with said first and second pass-through bores.

10. The electrical power and/or electronic data unit of claim 9, further comprising a wire conduit coupled to said bottom plate at said second bottom plate opening.

11. The electrical power and/or electronic data unit of claim 10, wherein said bottom plate comprises an internally-threaded cylindrical flange at said second bottom plate opening, and said wire conduit comprises a threaded portion for attaching to said cylindrical flange.

12. The electrical power and/or electronic data unit of claim 9, wherein said upper bezel cover defines first and second bezel openings fitted with respective covers that are selectively removable or openable to expose said first and second bezel openings.

13. The electrical power and/or electronic data unit of claim 9, further comprising an isolator wall mounted in said upper housing and aligned between said first and second pass-through bores.

14. An electrical power and/or electronic data unit for mounting in a floor or work surface, said electrical power and/or electronic data unit comprising:

an upper housing configured for mounting at an upper end portion of an opening formed in the floor or work surface, said upper housing defining a pass-through opening along a longitudinal housing axis;

an upper bezel cover mounted to an upper portion of said upper housing and configured to extend over the floor or work surface around the opening formed therein;

a lower insert spaced below said upper housing and having a longitudinal insert axis, said lower insert comprising a block of intumescent material defining a pass-through bore and a top plate secured at an upper surface of said lower insert, said top plate and said lower insert cooperating to define a plurality of recesses; and a plurality of coupling fasteners in a circumferentially-spaced arrangement around the longitudinal housing axis, said coupling fasteners having lower head portions received and retained at respective ones of said recesses of said lower insert, and upper end portions threadedly received and retained at said upper housing;

wherein said coupling fasteners are each independently adjustable to move a respective portion of said lower insert toward and away from a respective portion of said upper housing, to thereby change an angular position of said lower insert relative to said upper housing so that said lower insert is positionable with the longitudinal insert axis in parallel alignment with the longitudinal housing axis, and repositionable with the longitudinal insert axis set non-parallel to the longitudinal housing axis; and wherein a depth of said recesses is greater than a height of said head portions so that said respective portions of said lower insert and said upper housing are movable a limited distance toward or away from one another without adjusting said coupling fasteners.

15. The electrical power and/or electronic data unit of claim 14, wherein said upper bezel cover is removable or openable to provide pass-through access to said pass-through opening of said upper housing and said pass-through bore of said lower insert for routing cords through the opening formed in the floor or work surface and into a work area.

16. The electrical power and/or electronic data unit of claim 14, further comprising:

a top plate opening defined through said top plate and aligned with said pass-through bore of said block; and a bottom plate disposed along a lower surface of said block and defining a bottom plate opening aligned with said pass-through bore of said block.

17. The electrical power and/or electronic data unit of claim 14, wherein said upper housing comprises a plurality of fastener receivers projecting radially outwardly away from the longitudinal housing axis and receiving said upper end portions of said coupling fasteners.

18. An electrical power and/or electronic data unit for mounting in a floor or work surface, said electrical power and/or electronic data unit comprising:

an upper housing configured for mounting at an upper end portion of an opening formed in the floor or work surface, said upper housing defining a pass-through opening along a longitudinal housing axis;

an upper bezel cover mounted to an upper portion of said upper housing and configured to extend over the floor or work surface around the opening formed therein;

a lower insert spaced below said upper housing and having a longitudinal insert axis, said lower insert comprising a block of intumescent material defining a pass-through bore;

a top plate secured at an upper surface of said lower insert, said top plate and said lower insert cooperating to define a plurality of recesses; and at least three coupling fasteners in a circumferentially-spaced arrangement around the longitudinal housing axis, said coupling fasteners having lower end portions received and retained at respective ones of said recesses, and upper end portions received and retained at said upper housing;

wherein said coupling fasteners are each independently adjustable to move a respective portion of said lower insert toward and away from a respective portion of said upper housing, to thereby change an angular position of said lower insert relative to said upper housing so that said lower insert is positionable with the longitudinal insert axis in parallel alignment with the longitudinal housing axis, and repositionable in any direction with the longitudinal insert axis set non-parallel to the longitudinal housing axis; and wherein a depth of said recesses is such that said lower end portions of said coupling fasteners are movable a limited distance within said recesses without adjusting said coupling fasteners.

19. The electrical power and/or electronic data unit of claim 18, wherein said coupling fasteners are adjustable to urge said lower insert toward and away from said upper housing while maintaining the longitudinal insert axis in parallel alignment with the longitudinal housing axis, and to urge said lower insert toward and away from said upper housing while maintaining the longitudinal insert axis at a fixed non-parallel angle relative to the longitudinal housing axis.

20. The electrical power and/or electronic data unit of claim 18, wherein said upper bezel cover is removable or openable to provide pass-through access to said pass-through opening of said upper housing and said pass-through bore of said lower insert for routing cords through the opening formed in the floor or work surface and into a work area.

*     *     *     *     *